(12) United States Patent
Grivna et al.

(10) Patent No.: US 8,537,119 B1
(45) Date of Patent: *Sep. 17, 2013

(54) FEEDBACK MECHANISM FOR USER DETECTION OF REFERENCE LOCATION ON A SENSING DEVICE

(75) Inventors: Edward L. Grivna, Brooklyn Park, MN (US); David G. Wright, San Diego, CA (US); Ronald H. Sartore, Poway, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 13/401,683

(22) Filed: Feb. 21, 2012

Related U.S. Application Data

(63) Continuation of application No. 11/645,071, filed on Dec. 21, 2006, now Pat. No. 8,120,584.

(51) Int. Cl.
*G06F 3/02* (2006.01)
*G09G 5/00* (2006.01)

(52) U.S. Cl.
USPC .......................................... 345/169; 345/173

(58) Field of Classification Search
USPC .................. 345/156, 157, 168, 159, 169, 173
See application file for complete search history.

(56) References Cited

U.S. PATENT DOCUMENTS

| | | | |
|---|---|---|---|
| 4,234,871 A | 11/1980 | Guglielmi et al. | |
| 4,293,734 A | 10/1981 | Pepper, Jr. | |
| 4,359,720 A | 11/1982 | Chai et al. | |
| 5,543,591 A | 8/1996 | Gillespie et al. | |
| 5,666,113 A | 9/1997 | Logan | |
| 5,917,906 A | 6/1999 | Thornton | |
| 6,262,717 B1 | 7/2001 | Donohue et al. | |
| 6,473,069 B1 | 10/2002 | Gerpheide | |
| 6,704,005 B2 | 3/2004 | Kato et al. | |
| 7,148,875 B2 | 12/2006 | Rosenberg et al. | |
| 2006/0066582 A1 | 3/2006 | Lyon et al. | |

FOREIGN PATENT DOCUMENTS

| | | |
|---|---|---|
| JP | 10031547 A | 2/1998 |
| JP | 2000115306 A | 4/2000 |
| WO | 9737293 A | 10/1997 |

OTHER PUBLICATIONS

"Adding Tactile Feedback to Touchscreen Applications," TouchSense Technology for the Touchscreen Interface, Immersion Corporation, 2006, 4 pages.
"An Embedded Solution for Playing VibeTonz Touch Sensations on Mobile Handsets," VibeTonz Mobile Player, Immersion Corporation, 2005, 4 pages.
"Bringing the Powerul Sensation of Touch to the Mobie Phone Market," VibeTonz System, Immersion Corporation, 2005, 6 pages.
USPTO Final Rejection for U.S. Appl. No. 11/645,071 dated Oct. 27, 2011; 10 pages.
USPTO Final Rejection for U.S. Appl. No. 11/645,071 dated Oct. 28, 2010; 7 pages.

(Continued)

*Primary Examiner* — Ricardo L Osorio

(57) ABSTRACT

Devices including an audio mechanism and a processing device coupled to display on-screen buttons on a touch-screen display are described. The processing device is configured to detect a conductive object proximate to the touch-screen display and to determine a position of the conductive object on the touch-screen display. The processing device is configured to provide different sounds via the audio mechanism for different ones of the on-screen buttons when the position of the conductive object is determined within the different on-screen buttons to allow detection of a reference location on the touch-screen display.

20 Claims, 17 Drawing Sheets

(56) References Cited

OTHER PUBLICATIONS

USPTO Final Rejection for U.S. Appl. No. 11/645,071 dated Mar. 30, 2011; 8 pages.
USPTO Non-Final Rejection for U.S. Appl. No. 11/645,071 dated Jun. 23, 2010; 7 pages.
USPTO Non-Final Rejection for U.S. Appl. No. 11/645,071 dated Jul. 21, 2011; 7 pages.
USPTO Notice of Allowance for U.S. Appl. No. 11/645,071 dated Dec. 15, 2011; 7 pages.

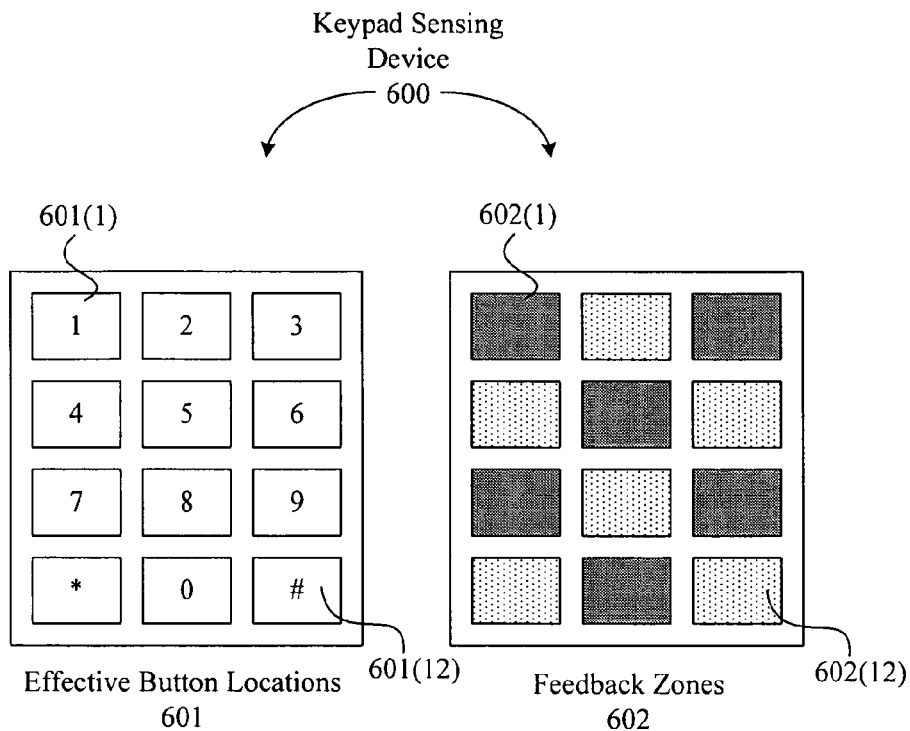
FIG. 6A
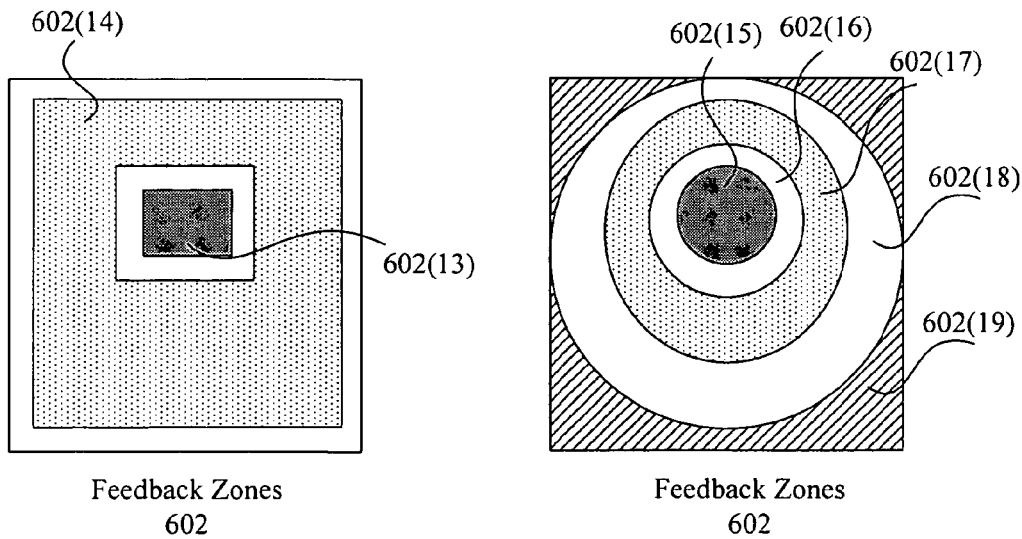
FIG. 6B
FIG. 6C

FEEDBACK MECHANISM FOR USER DETECTION OF REFERENCE LOCATION ON A SENSING DEVICE

RELATED APPLICATIONS

This application is a continuation application of U.S. application Ser. No. 11/645,071 filed Dec. 21, 2006, now U.S. Pat. No. 8,120,584 issued Feb. 21, 2012, which is incorporated herein by reference.

TECHNICAL FIELD

This invention relates to the field of user interface devices and, in particular, to touch-sensor devices.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

One type of touchpad operates by way of capacitance sensing utilizing capacitive sensors. The capacitance detected by a capacitive sensor changes as a function of the proximity of a conductive object to the sensor. The conductive object can be, for example, a stylus or a user's finger. In a touch-sensor device, a change in capacitance detected by each sensor in the X and Y dimensions of the sensor array due to the proximity or movement of a conductive object can be measured by a variety of methods. Regardless of the method, usually an electrical signal representative of the capacitance detected by each capacitive sensor is processed by a processing device, which in turn produces electrical or optical signals representative of the position of the conductive object in relation to the touch-sensor pad in the X and Y dimensions. A touch-sensor strip, slider, or button operates on the same capacitance-sensing principle.

Another user interface device that has become more common is a touch screen. Touch screens, also known as touchscreens, touch panels, or touchscreen panels are display overlays which are typically either pressure-sensitive (resistive), electrically-sensitive (capacitive), acoustically-sensitive (SAW—surface acoustic wave) or photo-sensitive (infrared). The effect of such overlays allows a display to be used as an input device, removing the keyboard and/or the mouse as the primary input device for interacting with the display's content. Such displays can be attached to computers or, as terminals, to networks. There are a number of types of touch screen technologies, such as optical imaging, resistive, surface acoustical wave, capacitive, infrared, dispersive signal, piezoelectric, and strain gauge technologies. Touch screens have become familiar in retail settings, on point of sale systems, on ATMs, on mobile handsets, on kiosks, on game consoles, and on PDAs where a stylus is sometimes used to manipulate the graphical user interface (GUI) and to enter data.

FIG. 1A illustrates a conventional touch-sensor pad. The touch-sensor pad 100 includes a sensing surface 101 on which a conductive object may be used to position a pointer in the x- and y-axes, using either relative or absolute positioning, or to select an item on a display. Touch-sensor pad 100 may also include two buttons, left and right buttons 102 and 103, respectively, shown here as an example. These buttons are typically mechanical buttons, and operate much like a left and right buttons on a mouse. These buttons permit a user to select items on a display or send other commands to the computing device.

FIG. 1B illustrates a conventional linear touch-sensor slider. The linear touch-sensor slider 110 includes a surface area 111 on which a conductive object may be used to control a setting on a device, such as volume or brightness. Alternatively, the linear touch-sensor slider 110 may be used for scrolling functions. The construct of touch-sensor slider 110 may be the same as that of touch-sensor pad 100. Touch-sensor slider 110 may include a sensor array capable of detection in only one dimension (referred to herein as one-dimensional sensor array). The slider structure may include one or more sensor elements that may be conductive traces. By positioning or manipulating a conductive object in contact or in proximity to a particular portion of the slider structure, the capacitance between each conductive trace and ground varies and can be detected. The capacitance variation may be sent as a signal on the conductive trace to a processing device. It should also be noted that the sensing may be performed in a differential fashion, obviating the need for a ground reference. For example, by detecting the relative capacitance of each sensor element, the position and/or motion (if any) of the external conductive object can be determined. In one embodiment, it can be determined which sensor element has detected the presence of the conductive object, and it can also be determined the motion and/or the position of the conductive object over multiple sensor elements.

One difference between touch-sensor sliders and touch-sensor pads may be how the signals are processed after detecting the conductive objects. Another difference is that the touch-sensor slider is not necessarily used to convey absolute positional information of a conducting object (e.g., to emulate a mouse in controlling pointer positioning on a display), but rather relative positional information. However, the touch-sensor slider and touch-sensor pad may be configured to support either relative or absolute coordinates, and/or to support one or more touch-sensor button functions of the sensing device.

FIG. 1C illustrates a conventional sensing device having three touch-sensor buttons. Conventional sensing device 120 includes button 121, button 122, and button 123. These buttons may be capacitive touch-sensor buttons. These three buttons may be used for user input using a conductive object, such as a finger.

In the design and implementation of many hand-held devices, cellular phones for example, the user is required to manipulate a number of push-buttons or switches for the purpose of dialing, storing information, accessing information, menus, etc. In many cases, this activation is done in non-pristine environments where direct visual monitoring of the display(s) in these devices is not possible. In these cases, the user requires some level of feedback from the device to indicate proper application of a switch closure or button press. Also, when a device of this type is operated where the user has no direct visual access to the button or sensor array, or where the user is physically handicapped such that visual confirmation is not possible, the user requires some type of tactile mechanism, such as a surface feature, from the device to provide a reference location in the sensor array. Such feedback may be static or dynamic in nature.

In one conventional design, as described in U.S. Pat. No. 6,704,005, passive mechanical tactile feedback is provided to the user by mechanical devices under the switch or button array. These mechanical elements may serve no other purpose in the operation of the button or switch. Also, since these mechanical devices are activated only after the switch or button is pressed, they serve no function for the location of any specific switch within the switch or button array.

The primary disadvantage of the conventional design, described above, is one of cost. Adding these mechanical elements increases the unit cost of the product. They also create a potential point of failure in the device, such that the normal button press or switch activation may still operate correctly, but the overall product would no longer meet specifications due to the failure of the passive mechanical, tactile feedback from one or more of the buttons. They may also incorrectly indicate activation or acceptance of a button press, even if the power source for the unit is removed, discharged, or otherwise disabled. These additional mechanical feedback elements would also increase the weight of the overall product, which is considered important in portable devices. Their inclusion in the button array also potentially increases the thickness of the array, which is also not considered to be beneficial to the use or marketability of the device.

The converse of invalid response also exists, in that the normal electrical detection mechanism, due to contact contamination, for example, may not report a button press to the device, while the passive mechanical feedback may indicate activation.

FIGS. 1D and 1E illustrate conventional mechanical keys of a portion of a keyboard and a keypad. In conventional designs of keyboards (e.g., keyboard 130) and keypads (e.g., keypad 140), such as those found on a desktop or laptop computer, passive tactile feedback for user detection of a reference location may be provided by including surface features (e.g., 135 and 136 of FIG. 1D and 144 of FIG. 1E), such as bumps or ridges, in the material (e.g., plastic) used to make the keys on the keyboard. These surface features may be located on the 'F' and 'J' keys 131 and 134 in standard QWERTY keyboards 130 and the '5' key 142 of keypad 140. The keys 131, 134, and 140 indicate the default or 'home' location (e.g., reference location) of a user's hands for touch-typing or numeric entry applications respectively. These keys are also known as home keys or reference keys.

A similar indicator is often provided on hand-held devices, such as a mobile handset, where the keypad is significantly smaller in size. Here the sensor array is normally that of a dialing pad, a portion of which being of equivalent function as that of the standard switch matrix found on touch-tone or similar telephones. In these button or sensor arrays, the 'home' position (e.g., reference location) is normally that of the '5' key which is located in approximately the center of the button or sensor array. To allow similar user detection of this 'home' reference location, the mechanical elements used to make the sensor array often contain similar molded or embossed physical features on or around the '5' key.

Using mechanical feedback mechanisms, such as the mechanical device described in U.S. Pat. No. 6,704,005, or surface features (e.g., bumps or ridges 135, 136, or 144) on the keys, works well for electromechanical switches in buttons or sensor arrays, however, such electromechanical switches have many known shortcomings: they are prone to failure due to fatigue and contamination, they physically increase the weight and spatial volume of the device, and they increase the manufacturing cost of the device relative to non-mechanical forms of sensor arrays.

These handheld devices are now becoming available with touch-sensor pad surfaces used to implement dialing keypads or other forms of data entry. For aesthetic and manufacturability reasons, these touch surfaces are often implemented without surface features to indicate the 'home' location. In these applications, some other form of feedback must be provided to the user to allow accurate determination of the 'home' reference location, individual button locations, and proper-activation position of button or switch-equivalent functions.

Another conventional design is disclosed in U.S. Pat. No. 6,262,717. This application discloses the patterning of the touch responsive surface with one or more different physical patterns such that a finger, sliding across the patterns, can distinguish one area from other areas having either different patterns or no patterns present on the touch responsive surface. Unless these surface patterns are significantly large in size, a finger inside a glove will not be able to sense their presence. This design also is disadvantageous for the increase in cost per unit for adding these mechanical elements. The mechanical elements also create a potential point of failure in the device, such that the normal button press or switch activation may still operate correctly (having no moving parts) but the overall product would no longer meet specifications due to the failure of the passive tactile feedback from one or more of the buttons through wear or other external forces. Their inclusion in the button array also potentially increases the thickness of the array.

As for a patterned surface, such patterning affects the aesthetics of the product, and also provides locations where various forms of dirt and surface contaminants can become trapped, skewing the normal touch response function of the product.

While such feedback is simple to implement in mechanical switches, this is not the case where the button is electronic in nature and has no moving parts, such as in capacitive sensing sensor elements.

BRIEF DESCRIPTION OF THE DRAWINGS

The present invention is illustrated by way of example, and not by way of limitation, in the figures of the accompanying drawings.

FIG. 6A illustrates one embodiment of a keypad sensing device, which includes multiple feedback zones to determine a particular feedback to be provided to the user that corresponds to the position of the conductive object on the keypad sensing device.

FIG. 6B illustrates one embodiment of a keypad sensing device, which includes two feedback zones to determine a particular feedback to be provided to the user that corresponds to the position of the conductive object on the keypad sensing device.

FIG. 6C illustrates one embodiment of a keypad sensing device, which includes five feedback zones to determine a particular feedback to be provided to the user that corresponds to the position of the conductive object on the keypad sensing device.

DETAILED DESCRIPTION

Figure 1A:
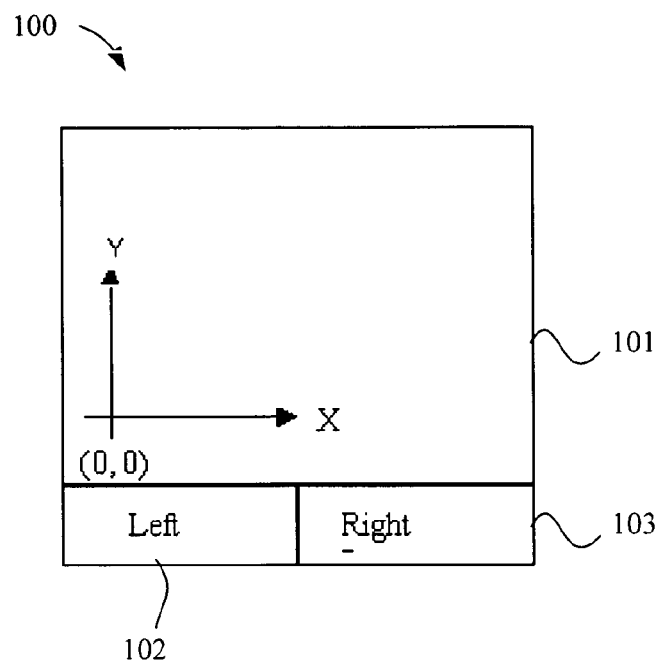
FIG. 1A illustrates a conventional touch-sensor pad.
Figure 1B:
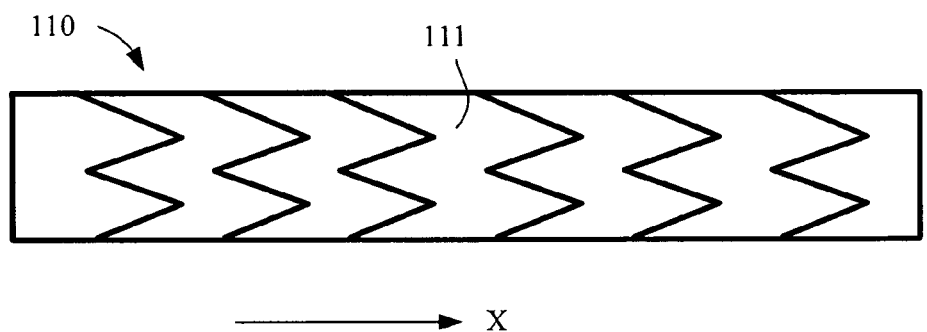
FIG. 1B illustrates a conventional linear touch-sensor slider.
Figure 1C:
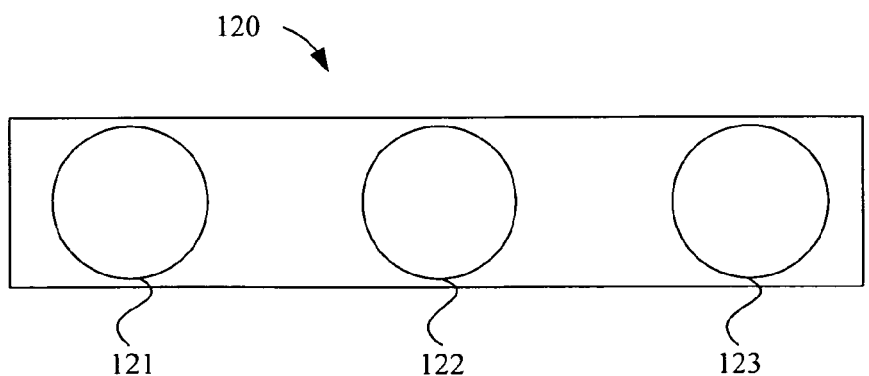
FIG. 1C illustrates a conventional sensing device having three touch-sensor buttons.
Figure 1D:
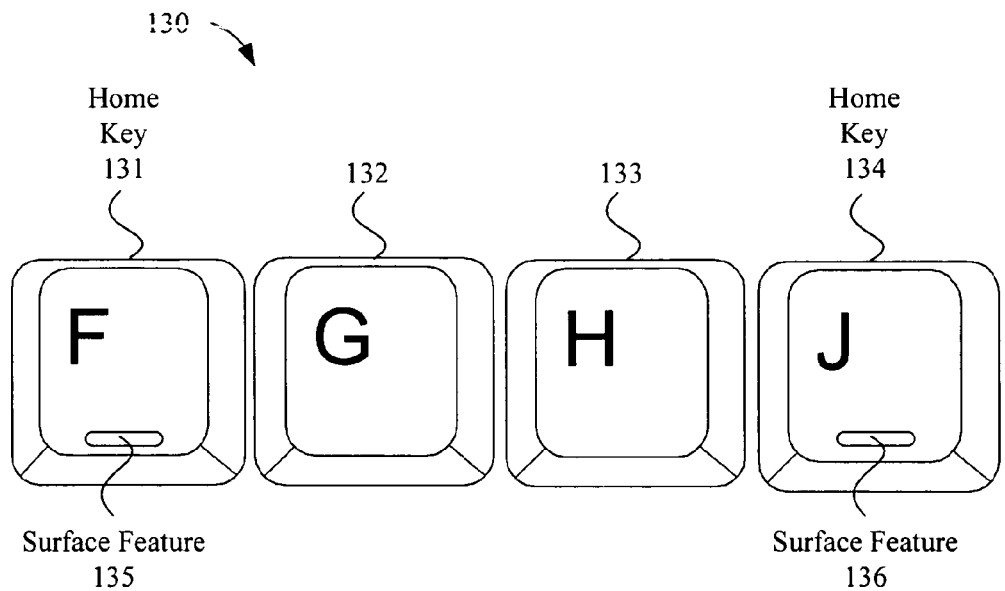
FIG. 1D illustrate conventional mechanical keys of a portion of a keyboard.
Figure 1E:
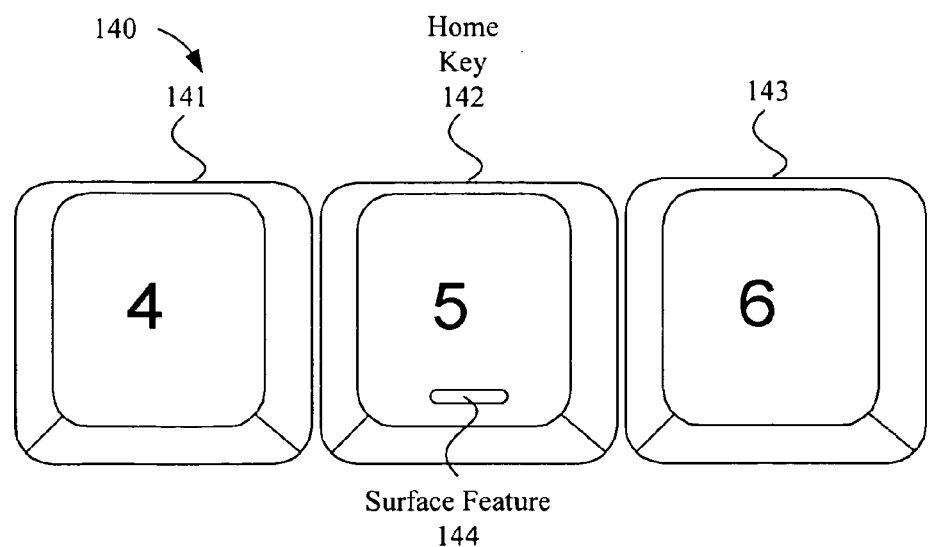
FIG. 1E illustrate conventional mechanical keys of a portion of a keypad.

Described herein is a method and apparatus providing an active feedback of a position of a conductive object, manipulated by a user on a sensing device, to allow detection of a reference location on the sensing device by the user. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of a method and apparatus are described to provide a vibrational, an audio, or an illuminating feedback to a user for user detection of a reference location on a sensing device. In one embodiment, the method may include detecting a presence of a conductive object, manipulated by a user, on a sensing device, and providing an active feedback of a position of the conductive object to the user to allow detection of a reference location or a specific key on the sensing device by the user. Active feedback, as used herein, refers to a feedback response that is not generated by a passive tactile feedback generator, such as described above with respect to the conventional designs, and is not provided by a surface feature disposed on the sensing device, but rather is provided by an active feedback mechanism, such as a vibrator, speaker, light source, any combination thereof or the like. The active feedback mechanism is a powered electrical or electromechanical component. It should be noted that the passive tactile feedback generators of the conventional designs are disposed to be part of the mechanical switches themselves, whereas the active feedback may be provided by a mechanism that is not part of the sensor element, such as a vibrator, speaker, or light source. It should also be noted that the active feedback may still be perceived by the user's sense of touch (e.g., vibrational feedback), but the active feedback is not provided by a passive tactile feedback generator or a surface feature that is disposed to be a part of, or on top of, the mechanical switch or key, but rather by a separate electrical, optical, or electromechanical component separate from the touch-sensor button. Reference location as used herein refers to a physical area on the sensing device that may give the user spatial orientation of the sensing device, for example, a home key that gives the user spatial orientation of the keys on a keypad or keyboard.

In one embodiment, the apparatus may include a sensing device to detect a presence of a conductive object, manipulated by a user on the sensing device, a processing device coupled to the sensing device, the processing device to determine a position of the conductive object on the sensing device, and a feedback mechanism coupled to the processing device to provide an active feedback to the user to allow detection of a reference location on the sensing device by the user. In one embodiment, the method may include detecting a presence of a conductive object, manipulated by a user, on a sensing device, and providing an active feedback of a position of the conductive object to the user to allow detection of a reference location on the sensing device by the user.

Standard cellular phones now incorporate multiple different ways to indicate detection of an incoming call. The primary method in these devices is through the use of audible ring-tones. Such audible ring tones may take the form of recorded or synthesized music, speech, tones, or other form of audible information. Using recorded or synthesized audio feedback, each feedback zone may operate as an independent zone, and effectively as its own reference location. For example, when using verbal feedback, a finger detected in the feedback zone that corresponds to the '1' key responds with a verbal "one." If the user desires to press the '1' key, the user does not need to first locate another separate reference location, such as the '5' key. For environments where such ringtones would be deemed disruptive, for example in a church, meeting room, or theater, these same devices normally offer a secondary method of ring indication using a vibrator. In other embodiments, the ring indication may be generated by a speaker or a light source; however, this ring indication may not be non-disruptive, unlike the ring indication from the vibrator. The embodiments described herein propose to extend the use of the vibrator, speaker, light source, or other active feedback mechanisms to also indicate detection of button press or activation, and to indicate detection of a reference location or home key on the sensing device when the sensor element itself provides no passive tactile feedback to the user.

The primary change from the conventional designs is the complete removal of the passive feedback mechanisms (e.g., mechanical, tactile feedback generators) or surface features from the button or sensor array, and their replacement with an electrical or software controlled activation of the active feedback mechanism, such as an existing vibrator, speaker, or light source, to provide active feedback to the user to allow detection of a reference location on the sensing device by the user.

The embodiments described herein make use of electronic and electromechanical components, often already present within the device, to provide an equivalent level of feedback as other passive feedback mechanisms or surface features. These components may include a vibrator, a speaker, a light source, any combination thereof, or the like.

Figure 2:
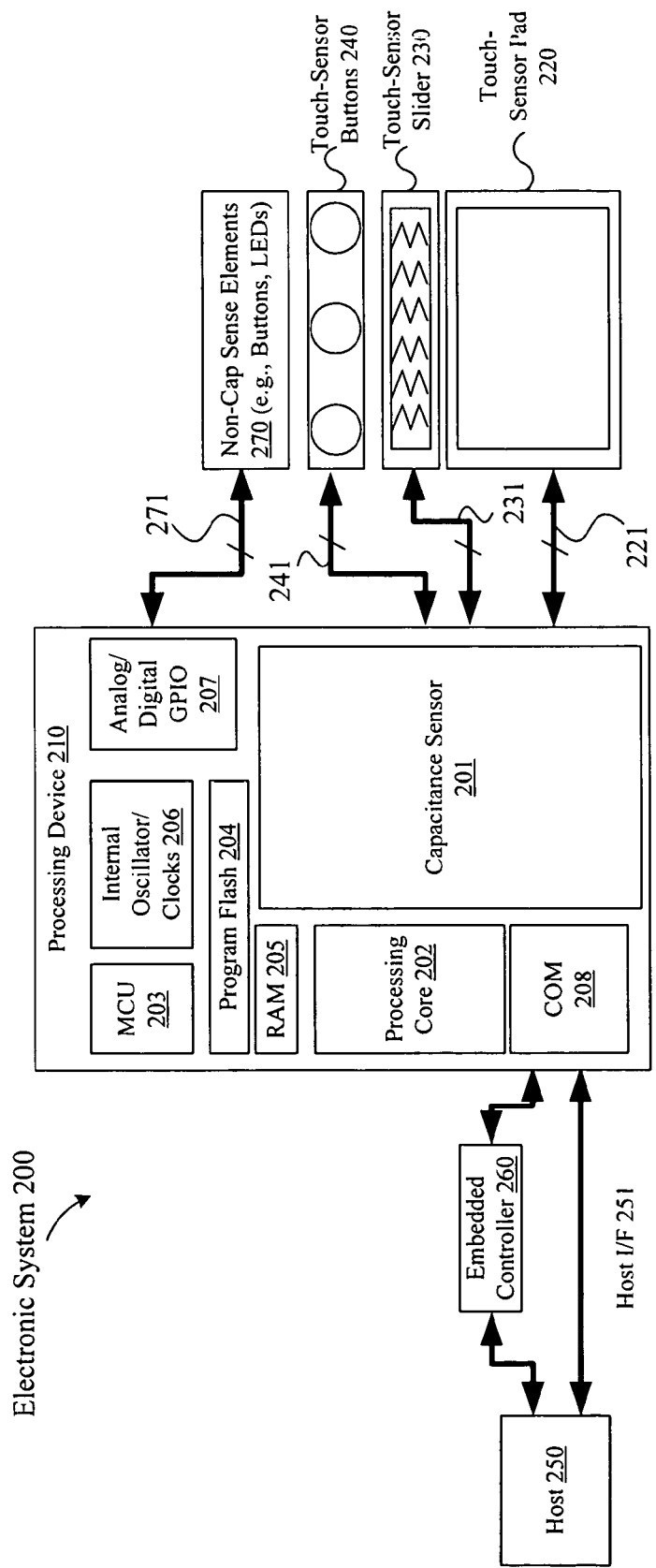
FIG. 2 illustrates a block diagram of one embodiment of an electronic system having a processing device for detecting a presence of a conductive object.

FIG. 2 illustrates a block diagram of one embodiment of an electronic system having a processing device for detecting a presence of a conductive object. Electronic system 200 includes processing device 210, touch-sensor pad 220, touch-sensor slider 230, touch-sensor buttons 240, host processor 250, embedded controller 260, and non-capacitance sensor elements 270. The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnect between GPIO ports 207 and a digital block array of the processing device 210 (not illustrated). The digital block array may be configured to implement a variety of digital logic circuits (e.g., DAC, digital filters, digital control systems) using, in one embodiment, configurable user modules ("UMs"). The digital block array may be coupled to a system bus (not illustrated). Processing device 210 may also include memory, such as random access memory (RAM) 205 and program flash 204. RAM 205 may be static RAM (SRAM) or the like, and program flash 204 may be a non-volatile storage, or the like, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. Analog block array also may be configured to implement a variety of analog circuits (e.g., ADC, analog filters) using, in one embodiment, configurable UMs. The analog block array may also be coupled to the GPIO 207.

As illustrated, capacitance sensor 201 may be integrated into processing device 210. Capacitance sensor 201 may include analog I/O for coupling to an external component, such as touch-sensor pad 220, touch-sensor slider 230, touch-sensor buttons 240, and/or other devices. Capacitance sensor 201 and processing device 210 are described in more detail below.

It should be noted that the embodiments described herein are not limited to touch-sensor pads for notebook implementations, but can be used in other capacitive sensing implementations, for example, the sensing device may be a touch screen, a touch-sensor slider 230, or a touch-sensor button 240 (e.g., capacitance sensing button). It should also be noted that the embodiments described herein may be implemented in other sensing technologies than capacitive sensing, such as resistive, optical imaging, surface acoustical wave (SAW), infrared, dispersive signal, and strain gauge technologies. Similarly, the operations described herein are not limited to notebook pointer operations, but can include other operations, such as lighting control (dimmer), temperature or environmental control, volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition and numeric keypad operation.

In one embodiment, the electronic system 200 includes a touch-sensor pad 220 coupled to the processing device 210 via bus 221. Touch-sensor pad 220 may include a two-dimension sensor array. The two-dimension sensor array includes multiple sensor elements, organized as rows and columns. In another embodiment, the electronic system 200 includes a touch-sensor slider 230 coupled to the processing device 210 via bus 231. Touch-sensor slider 230 may include a single-dimension sensor array. The single-dimension sensor array includes multiple sensor elements, organized as rows, or alternatively, as columns. In another embodiment, the electronic system 200 includes touch-sensor buttons 240 coupled to the processing device 210 via bus 241. Touch-sensor button 240 may include a single-dimension or multi-dimension sensor array. The single- or multi-dimension sensor array includes multiple sensor elements. For a touch-sensor button, the sensor elements may be coupled together to detect a presence of a conductive object over the entire surface of the sensing device. Alternatively, the touch-sensor button 240 has a single sensor element to detect the presence of the conductive object. In one embodiment, the touch-sensor button 240 may be a capacitance sensor element. Capacitance sensor elements may be used as non-contact sensors. These sensor elements, when protected by an insulating layer, offer resistance to severe environments.

The electronic system 200 may include any combination of one or more of the touch-sensor pad 220, touch-sensor slider 230, and/or touch-sensor button 240. In another embodiment, the electronic system 200 may also include non-capacitance sensor elements 270 coupled to the processing device 210 via bus 271. The non-capacitance sensor elements 270 may include buttons, light emitting diodes (LEDs), and other user interface devices, such as a mouse, a keyboard, a display, or other functional keys that do not require capacitance sensing. In one embodiment, buses 271, 241, 231, and 221 may be a single bus. Alternatively, these buses may be configured into any combination of one or more separate buses.

The processing device 210 may also provide value-added functionality such as keyboard control integration, LEDs, battery charger and general purpose I/O, as illustrated as non-capacitance sensor elements 270. Non-capacitance sensor elements 270 are coupled to the GPIO 207.

Processing device 210 may include internal oscillator/clocks 206 and communication block 208. The oscillator/clocks block 206 provides clock signals to one or more of the components of processing device 210. Communication block 208 may be used to communicate with an external component, such as a host processor 250, via host interface (I/F) 251. Alternatively, processing block 210 may also be coupled to embedded controller 260 to communicate with the external components, such as host 250. Interfacing to the host 250 can be through various methods. In one exemplary embodiment, interfacing with the host 250 may be done using a standard PS/2 interface to connect to an embedded controller 260, which in turn sends data to the host 250 via a low pin count (LPC) interface. In some instances, it may be beneficial for the processing device 210 to do both touch-sensor pad and keyboard control operations, thereby freeing up the embedded controller 260 for other housekeeping functions. In another exemplary embodiment, interfacing may be done using a universal serial bus (USB) interface directly coupled to the host 250 via host interface 251. Alternatively, the processing device 210 may communicate to external components, such as the host 250 using industry standard interfaces, such as USB, PS/2, inter-integrated circuit (I2C) bus, or system packet interfaces (SPI). The host 250 and/or embedded controller 260 may be coupled to the processing device 210 with a ribbon or flex cable from an assembly, which houses the sensing device and processing device.

In one embodiment, the processing device 210 is configured to communicate with the embedded controller 260 or the host 250 to send and/or receive data. The data may be a command or alternatively a signal. In an exemplary embodiment, the electronic system 200 may operate in both standard-mouse compatible and enhanced modes. The standard-mouse compatible mode utilizes the HID class drivers already built into the Operating System (OS) software of host 250. These drivers enable the processing device 210 and sensing device to operate as a standard pointer control user interface device, such as a two-button PS/2 mouse. The enhanced mode may enable additional features such as scrolling or disabling the sensing device, such as when a mouse is plugged into the notebook. Alternatively, the processing device 210 may be configured to communicate with the embedded controller 260 or the host 250, using non-OS drivers, such as dedicated touch-sensor pad drivers, or other drivers known by those of ordinary skill in the art.

In one embodiment, the processing device 210 may operate to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may directly communicate with the processing device 210 via host interface 251.

In one embodiment, the data sent to the host 250 from the processing device 210 includes click, double-click, movement of the pointer, scroll-up, scroll-down, scroll-left, scroll-right, step Back, and step Forward. In another embodiment, the data sent to the host 250 include the position or location of the conductive object on the sensing device. Alternatively, other user interface device commands may be communicated to the host 250 from the processing device 210. These commands may be based on gestures occurring on the sensing device that are recognized by the processing device, such as tap, push, hop, drag, and zigzag gestures. Alternatively, other commands may be recognized. Similarly, signals may be sent that indicate the recognition of these operations.

In particular, a tap gesture, for example, may be when the finger (e.g., conductive object) is on the sensing device for less than a threshold time. If the time the finger is placed on the touchpad is greater than the threshold time it may be considered to be a movement of the pointer, in the x- or y-axes. Scroll-up, scroll-down, scroll-left, and scroll-right, step back, and step-forward may be detected when the absolute position of the conductive object is within a pre-defined area, and movement of the conductive object is detected.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be a Programmable System on a Chip (PSoC™) processing device, manufactured by Cypress Semiconductor Corporation, San Jose, Calif. Alternatively, processing device 210 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

It should also be noted that the embodiments described herein are not limited to having a configuration of a processing device coupled to a host, but may include a system that measures the capacitance on the sensing device and sends the raw data to a host computer where it is analyzed by an application. In effect the processing that is done by processing device 210 may also be done in the host. In another embodiment, the processing device 210 is the host.

In one embodiment, the method and apparatus described herein may be implemented in a fully self-contained touch-sensor pad, which outputs fully processed x/y movement and gesture data signals or data commands to a host. In another embodiment, the method and apparatus may be implemented in a touch-sensor pad, which outputs x/y movement data and also finger presence data to a host, and where the host processes the received data to detect gestures. In another embodiment, the method and apparatus may be implemented in a touch-sensor pad, which outputs raw capacitance data to a host, where the host processes the capacitance data to compensate for quiescent and stray capacitance, and calculates x/y movement and detects gestures by processing the capacitance data. Alternatively, the method and apparatus may be implemented in a touch-sensor pad, which outputs pre-processed capacitance data to a host, where the touchpad processes the capacitance data to compensate for quiescent and stray capacitance, and the host calculates x/y movement and detects gestures from the pre-processed capacitance data.

In one embodiment, the electronic system that includes the embodiments described herein may be implemented in a conventional laptop touch-sensor pad. Alternatively, it may be implemented in a wired or wireless keyboard integrating a touch-sensor pad, which is itself connected to a host. In such an implementation, the processing described above as being performed by the "host" may be performed in part or in whole by the keyboard controller, which may then pass fully processed, pre-processed or unprocessed data to the system host. In another embodiment, the embodiments may be implemented in a mobile handset (e.g., cellular or mobile phone) or other electronic devices where the touch-sensor pad may operate in one of two or more modes. For example, the touch-sensor pad may operate either as a touch-sensor pad for x/y positioning and gesture recognition, or as a keypad or other arrays of touch-sensor buttons and/or sliders. Alternatively, the touch-sensor pad, although configured to operate in the two modes, may be configured to be used only as a keypad.

Capacitance sensor 201 may be integrated into the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware description language, such as VHDL or Verilog, and stored to a machine-accessible medium (e.g., Flash ROM, CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 201.

It should be noted that the components of electronic system 200 may include all the components described above. Alternatively, electronic system 200 may include only some of the components described above, or include additional components not listed herein.

In one embodiment, electronic system 200 may be used in a notebook computer. Alternatively, the electronic device may be used in other applications, such as a mobile handset, a personal data assistant (PDA), a kiosk, a keyboard, a television, a remote control, a monitor, a handheld multi-media device, a handheld video player, a handheld gaming device, or a control panel.

In one embodiment, capacitance sensor 201 may be a capacitive sense relaxation oscillator (CSR). The CSR may be coupled to an array of sensor elements using a current-programmable relaxation oscillator, an analog multiplexer, digital counting functions, and high-level software routines to compensate for environmental and physical sensor element variations. The sensor array may include combinations of independent sensor elements, sliding sensor elements (e.g., touch-sensor slider), and touch-sensor sensor element pads (e.g., touch pad or touch screen) implemented as a pair of orthogonal sliding sensor elements. The CSR may include physical, electrical, and software components. The physical components may include the physical sensor element itself, typically a pattern constructed on a printed circuit board (PCB) with an insulating cover, a flexible membrane, or a transparent overlay. The electrical component may include an oscillator or other means to convert a capacitance into a measured value. The electrical component may also include a counter or timer to measure the oscillator output. The software component may include detection and compensation algorithms to convert the count value into a sensor element detection decision (also referred to as switch detection decision). For example, in the case of slider sensor elements or X-Y touch-sensor sensor element pads, a calculation for finding position of the conductive object to greater resolution than the physical pitch of the sensor elements may be used.

It should be noted that there are various known methods for measuring capacitance. Although some embodiments described herein are described using a relaxation oscillator, the present embodiments are not limited to using relaxation oscillators, but may include other methods, such as current versus voltage phase shift measurement, resistor-capacitor charge timing, capacitive bridge divider, charge transfer, sigma-delta modulators, charge-accumulation circuits, or the like.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitance values may require very large resistors for reasonable timing. The capacitive bridge divider may include driving the capacitor under test through a fixed reference capacitor. The reference capacitor and the capacitor under test form a voltage divider. The voltage signal may be recovered with a synchronous demodulator, which may be done in the processing device 210. The charge transfer may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is discharged. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Figure 3A:
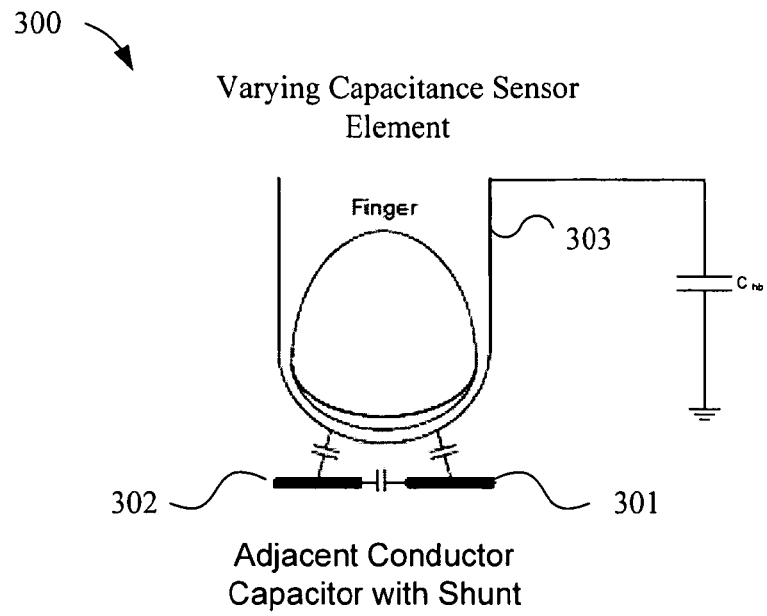
FIG. 3A illustrates a varying capacitance sensor element.

FIG. 3A illustrates a varying capacitance sensor element. In its basic form, a capacitance sensor element 300 is a pair of adjacent conductors 301 and 302. There is a small edge-to-edge capacitance, but the intent of sensor element layout is to minimize the parasitic capacitance $C_P$ between these conductors. When a conductive object 303 (e.g., finger) is placed in proximity to the two conductors 301 and 302, there is a capacitance between electrode 301 and the conductive object 303 and a similar capacitance between the conductive object 303 and the other electrode 302. The capacitance between the electrodes when no conductive object 303 is present is the base capacitance $C_P$ that may be stored as a baseline value. There is also a total capacitance ($C_P+C_F$) on the sensor element 300 when the conductive object 303 is present on or in close proximity to the sensor element 300. The baseline capacitance value $C_P$ may be subtracted from the total capacitance when the conductive object 303 is present to determine the change in capacitance (e.g., capacitance variation $C_F$) when the conductive object 303 is present and when the conductive object 303 is not present on the sensor element. Effectively, the capacitance variation $C_F$ can be measured to determine whether a conductive object 303 is present or not (e.g., sensor activation) on the sensor element 300.

Capacitance sensor element 300 may be used in a capacitance sensor array. The capacitance sensor array is a set of capacitors where one side of each capacitor is connected to a system ground. When the capacitance sensor element 300 is used in the sensor array, when the conductor 301 is sensed, the conductor 302 is connected to ground, and when the conductor 302 is sensed, the conductor 301 is connected to ground. Alternatively, when the sensor element is used for a touch-sensor button, the sensor element is sensed and the sensed button area is surrounded by a fixed ground. The presence of the conductive object 303 increases the capacitance ($C_P+C_F$) of the sensor element 300 to ground. Determining sensor element activation is then a matter of measuring change in the capacitance ($C_F$) or capacitance variation. Sensor element 300 is also known as a grounded variable capacitor.

The conductive object 303 in this embodiment has been illustrated as a finger. Alternatively, this technique may be applied to any conductive object, for example, a conductive door switch, position sensor, or conductive pen in a stylus tracking system (e.g., stylus).

The capacitance sensor element 300 is known as a projected capacitance sensor. Alternatively, the capacitance sensor element 300 may be a surface capacitance sensor that does not make use of rows or columns, but instead makes use of a single linearized field, such as the surface capacitance sensor described in U.S. Pat. No. 4,293,734. The surface capacitance sensor may be used in touch screen applications.

Figure 3B:
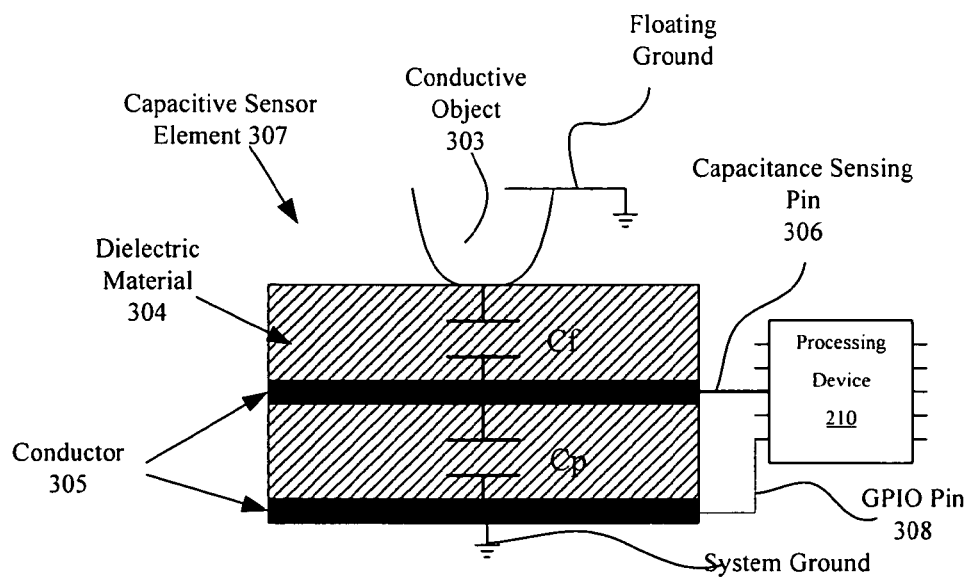
FIG. 3B illustrates one embodiment of a sensing device coupled to a processing device.

FIG. 3B illustrates one embodiment of a capacitance sensor element 307 coupled to a processing device 210. Capacitance sensor element 307 illustrates the capacitance as seen by the processing device 210 on the capacitance sensing pin 306. As described above, when a conductive object 303 (e.g., finger) is placed in proximity to one of the conductors 305, there is a capacitance, $C_F$, between the one of the conductors 305 and the conductive object 303 with respect to ground. This ground, however, may be a floating ground. Also, there is a capacitance, $C_P$, between the conductors 305, with one of the conductors 305 being connected to a system ground. The grounded conductor may be coupled to the processing device 210 using GPIO pin 308. The conductors 305 may be metal, or alternatively, the conductors may be conductive ink (e.g., carbon ink), conductive ceramic (e.g., transparent conductors of indium tin oxide (ITO)), or conductive polymers. In one embodiment, the grounded conductor may be an adjacent sensor element. Alternatively, the grounded conductor may be other grounding mechanisms, such as a surrounding ground plane. Accordingly, the processing device 210 can measure the change in capacitance, capacitance variation $C_F$, as the conductive object is in proximity to one of the conductors 305. Above and below the conductor that is closest to the conductive object 303 is dielectric material 304. The dielectric material 304 above the conductor 305 can be an overlay, as described in more detail below. The overlay may be non-conductive material used to protect the circuitry from environmental conditions and ESD, and to insulate the user's finger (e.g., conductive object) from the circuitry. Capacitance sensor element 307 may be a sensor element of a touch-sensor pad, a touch-sensor slider, or a touch-sensor button.

Figure 3C:
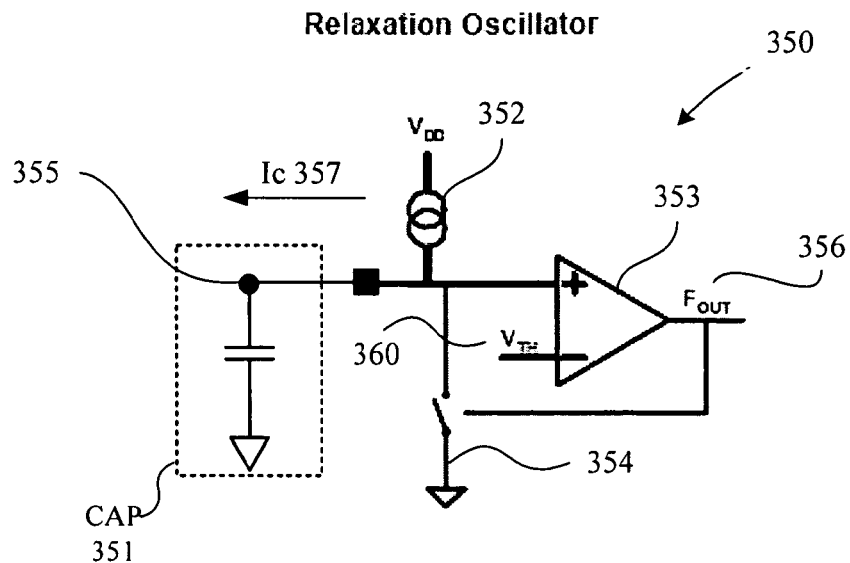
FIG. 3C illustrates one embodiment of a relaxation oscillator for measuring capacitance on a sensor element.

FIG. 3C illustrates one embodiment of a relaxation oscillator. The relaxation oscillator 350 is formed by the capacitance to be measured on capacitor 351, a charging current source 352, a comparator 353, and a reset switch 354 (also referred to as a discharge switch). It should be noted that capacitor 351 is representative of the capacitance measured on a sensor element of a sensor array. The relaxation oscillator is coupled to drive a charging current (Ic) 357 in a single direction onto a device under test ("DUT") capacitor, capacitor 351. As the charging current piles charge onto the capacitor 351, the voltage across the capacitor increases with time as a function of Ic 357 and its capacitance C. Equation (1) describes the relation between current, capacitance, voltage and time for a charging capacitor.

$$CdV=I_c dt \quad (1)$$

The relaxation oscillator begins by charging the capacitor 351, at a fixed current Ic 357, from a ground potential or zero voltage until the voltage across the capacitor 351 at node 355 reaches a reference voltage or threshold voltage, $V_{TH}$ 360. At the threshold voltage $V_{TH}$ 360, the relaxation oscillator allows the accumulated charge at node 355 to discharge (e.g., the capacitor 351 to "relax" back to the ground potential) and then the process repeats itself. In particular, the output of comparator 353 asserts a clock signal $F_{OUT}$ 350 (e.g., $F_{OUT}$ 356 goes high), which enables the reset switch 354. This discharges the capacitor at node 355 to ground and the charge cycle starts again. The relaxation oscillator outputs a relaxation oscillator clock signal ($F_{OUT}$ 356) having a frequency ($f_{RO}$) dependent upon capacitance C of the capacitor 351 and charging current Ic 357.

The comparator trip time of the comparator 353 and reset switch 354 add a fixed delay. The output of the comparator 353 is synchronized with a reference system clock to guarantee that the reset time is long enough to completely discharge capacitor 351. This sets a practical upper limit to the operating frequency. For example, if capacitance C of the capacitor 351 changes, then $f_{RO}$ changes proportionally according to Equation (1). By comparing $f_{RO}$ of $F_{OUT}$ 356 against the frequency ($f_{REF}$) of a known reference system clock signal (REF CLK), the change in capacitance $\Delta C$ can be measured. Accordingly, equations (2) and (3) below describe that a change in frequency between $F_{OUT}$ 356 and REF CLK is proportional to a change in capacitance of the capacitor 351.

$$\Delta C \propto \Delta f, \text{ where} \quad (2)$$

$$\Delta f = f_{RO} - f_{REF} \quad (3)$$

In one embodiment, a frequency comparator may be coupled to receive relaxation oscillator clock signal ($F_{OUT}$ 356) and REF CLK, compare their frequencies $f_{RO}$ and $f_{REF}$, respectively, and output a signal indicative of the difference $\Delta f$ between these frequencies. By monitoring $\Delta f$ one can determine whether the capacitance of the capacitor 351 has changed.

In one exemplary embodiment, the relaxation oscillator 350 may be built using a programmable timer (e.g., 555 timer) to implement the comparator 353 and reset switch 354. Alternatively, the relaxation oscillator 350 may be built using other circuitry. Relaxation oscillators are known by those of ordinary skill in the art, and accordingly, additional details regarding their operation have not been included so as to not obscure the present embodiments. The capacitor charging current for the relaxation oscillator 350 may be generated in a register programmable current output DAC (also known as IDAC). Accordingly, the current source 352 may be a current DAC or IDAC. The IDAC output current may be set by an 8-bit value provided by the processing device 210, such as from the processing core 202. The 8-bit value may be stored in a register or in memory.

In many capacitance sensor element designs, the two "conductors" (e.g., 301 and 302) of the sensing capacitor are actually adjacent sensor elements that are electrically isolated (e.g., PCB pads or traces), as indicated in FIG. 3A. Typically, one of these conductors is connected to a system ground. Layouts for touch-sensor slider (e.g., linear slide sensor elements) and touch-sensor pad applications have sensor elements that may be immediately adjacent. In these cases, all of the sensor elements that are not active are connected to a system ground through the GPIO 207 of the processing device 210 dedicated to that pin. The actual capacitance between adjacent conductors is small ($C_P$), but the capacitance of the active conductor (and its PCB trace back to the processing device 210) to ground, when detecting the presence of the conductive object 303, may be considerably higher ($C_P+C_F$). The capacitance of two parallel conductors is given by the following equation:

$$C = \varepsilon_0 \cdot \varepsilon_R \cdot \frac{A}{d} = \varepsilon_R \cdot 8.85 \cdot \frac{A}{d} \text{ pF/m} \qquad (4)$$

The dimensions of equation (4) are in meters. This is a very simple model of the capacitance. The reality is that there are fringing effects that substantially increase the sensor element-to-ground (and PCB trace-to-ground) capacitance.

Sensor element sensitivity (i.e., activation distance) may be increased by one or more of the following: 1) increasing board thickness to increase the distance between the active sensor element and any parasitics; 2) minimizing PCB trace routing underneath sensor elements; 3) utilizing a gridded ground with 50% or less fill if use of a ground plane is absolutely necessary; 4) increasing the spacing between sensor element pads and any adjacent ground plane; 5) increasing pad area; 6) decreasing thickness of any insulating overlay; 7) using higher dielectric constant material in the insulating overlay; or 8) verifying that there is no air-gap between the PC pad surface and the touching finger.

There is some variation of sensor element sensitivity as a result of environmental factors. A baseline update routine, which compensates for this variation, may be provided in the high-level APIs.

As described above with respect to the relaxation oscillator 350, when a finger or conductive object is placed on the sensor element, the capacitance increases from $C_P$ to $C_P+C_F$ so the relaxation oscillator output signal 356 ($F_{OUT}$) decreases in frequency. The relaxation oscillator output signal 356 ($F_{OUT}$) may be fed to a digital counter for measurement. There are two methods for counting the relaxation oscillator output signal 356: frequency measurement and period measurement. Additional details of the relaxation oscillator and digital counter are known by those of ordinary skill in the art, and accordingly a detailed description regarding them have not been included. It should also be noted, that the embodiments described herein are not limited to using relaxation oscillators, but may include other sensing circuitry for measuring capacitance, such as versus voltage phase shift measurement, resistor-capacitor charge timing, capacitive bridge divider, charge transfer, sigma-delta modulators, charge-accumulation circuits, or the like.

Figure 3D:
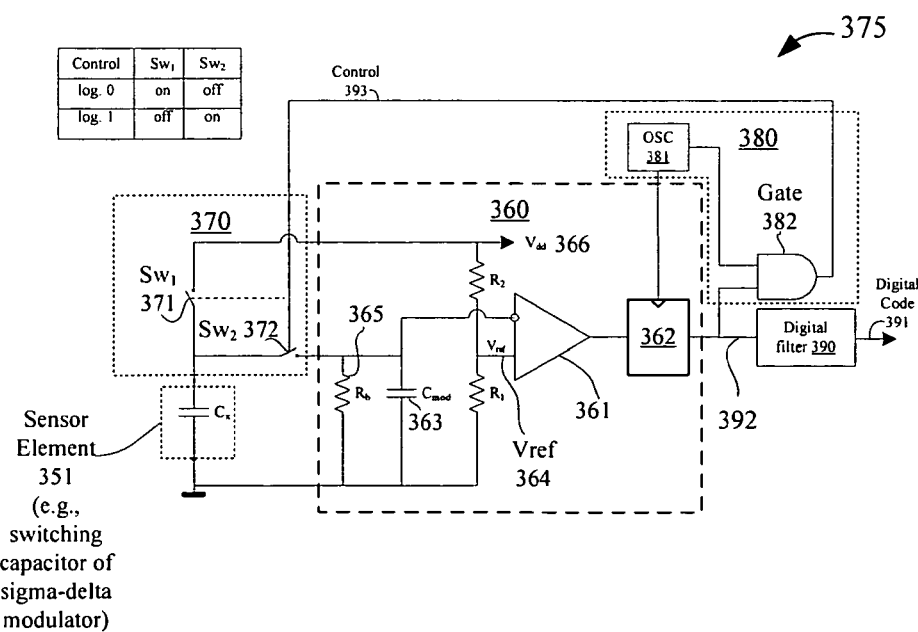
FIG. 3D illustrates a schematic of one embodiment of a circuit including a sigma-delta modulator and a digital filter for measuring capacitance on a sensor element.

FIG. 3D illustrates a schematic of one embodiment of a circuit 375 including a sigma-delta modulator 360 and a digital filter 390 for measuring capacitance on a sensor element 351. Circuit 375 includes a switching circuit 370, switching clock source 380, sigma-delta modulator 360, and digital filter 390 for measuring the capacitance on sensor element 351. Sensor element 351 may be a sensor element of sensor array 410, and is represented as a switching capacitor $C_X$ in the modulator feedback loop. Alternatively, sensor element 351 may be a single element, such as used in a touch-sensor button. Switching circuit 370 includes two switches $Sw_1$ 371 and $Sw_2$ 372. The switches $Sw_1$ 371 and $Sw_2$ 372 operate in two, non-overlapping phases (also known as break-before-make configuration). These switches together with sensing capacitor $C_X$ 351 form the switching capacitor equivalent resistor, which provides the modulator capacitor $C_{mod}$ 363 of sigma-delta modulator 360 charge current (as illustrated in FIG. 3D) or discharge current (not illustrated) during one of the two phases.

The sigma-delta modulator 360 includes the comparator 361, latch 362, modulator capacitor $C_{mod}$ 363, modulator feedback resistor 365, which may also be referred to as bias resistor 365, and voltage source 366. The output of the comparator may be configured to toggle when the voltage on the modulator capacitor 363 crosses a reference voltage 364. The reference voltage 364 may be a pre-programmed value, and may be configured to be programmable. The sigma-delta modulator 360 also includes a latch 362 coupled to the output of the comparator 361 to latch the output of the comparator 361 for a given amount of time, and provide as an output, output 392. The latch may be configured to latch the output of the comparator based on a clock signal from the gate circuit 382 (e.g., oscillator signal from the oscillator 381). In another embodiment, the sigma-delta modulator 360 may include a synchronized latch that operates to latch an output of the comparator for a pre-determined length of time. The output of the comparator may be latched for measuring or sampling the output signal of the comparator 361 by the digital filter 390.

Sigma-delta modulator 360 is configured to keep the voltage on the modulator capacitor 363 close to reference voltage $V_{ref}$ 364 by alternatively connecting the switching capacitor resistor (e.g., switches $Sw_1$ 371 and $Sw_2$ 372 and sensing capacitor $C_x$ 351) to the modulator capacitor 363. The output 392 of the sigma-delta modulator 360 (e.g., output of latch 362) is feedback to the switching clock circuit 380, which controls the timing of the switching operations of switches $Sw_1$ 371 and $Sw_2$ 372 of switching circuit 370. For example, in this embodiment, the switching clock circuit 380 includes an oscillator 381 and gate 382. Alternatively, the switching clock circuit 380 may include a clock source, such as a spread spectrum clock source (e.g., pseudo-random signal (PRS)), a frequency divider, a pulse width modulator (PWM), or the like. The output 392 of the sigma-delta modulator 360 is used with an oscillator signal to gate a control signal 393, which switches the switches $Sw_1$ 371 and $Sw_2$ 372 in a non-overlapping manner (e.g., two, non-overlapping phases). The output 392 of the sigma-delta modulator 360 is also output to digital filter 390, which filters and/or converts the output into the digital code 391.

In one embodiment of the method of operation, at power on, the modulator capacitor 363 has zero voltage and switching capacitor resistor (formed by sensing capacitor Cx 351, and switches $Sw_1$ 371 and $Sw_2$ 372) is connected between Vdd line 366 and modulator capacitor 363. This connection allows the voltage on the modulator capacitor 363 to rise. When this voltage reaches the comparator reference voltage, $V_{ref}$ 364, the comparator 361 toggles and gates the control signal 393 of the switches $Sw_1$ 371 and $Sw_2$ 372, stopping the charge current. Because the current via bias resistors $R_b$ 365 continues to flow, the voltage on modulator capacitor 363 starts dropping. When it drops below the reference voltage 364, the output of the comparator 361 switches again, enabling the modulator capacitor 363 to start charging. The latch 362 and the comparator 361 set sample frequency of the sigma-delta modulator 360.

The digital filter 390 is coupled to receive the output 392 of the sigma-delta modulator 360. The output 392 of the sigma-delta modulator 360 may be a single bit bit-stream, which can be filtered and/or converted to numerical values using a digital filter 390. In one embodiment, the digital filter 390 is a counter. In another embodiment, the standard Sinc digital filter can be used. In another embodiment, the digital filter is a decimator. Alternatively, other digital filters may be used for filtering and/or converting the output 392 of the sigma-delta modulator 360 to provide the digital code 391. It should also be noted that the output 392 may be output to the decision logic 402 or other components of the processing device 210, or to the decision logic 451 or other components of the host 250 to process the bitstream output of the sigma-delta modulator 360.

Described below are the mathematical equations that represent the operations of FIG. 3D. During a normal operation mode, the sigma-delta modulator 360 keeps these currents equal in the average by keeping the voltage on the modulator 363 equal to, or close to, the reference voltage $V_{ref}$ 364. The current of the bias resistor $R_b$ 365 is:

$$I_{Rb} = \frac{V_{cmod}}{R_b} \quad (5)$$

The sensing capacitor $C_x$ 351 in the switched-capacitor mode has equivalent resistance:

$$R_c = \frac{1}{f_s C_x} \quad (6)$$

where $f_s$ is the operation frequency of the switches (e.g., switching circuit 370). If the output 392 of the sigma-delta modulator 360 has a duty cycle of $d_{mod}$, the average current of the switching capacitor 351 can be expressed in the following equation (7):

$$I_c = d_{mod} \frac{V_{dd} - V_{Cmod}}{R_c} \quad (7)$$

In the operation mode, $$I_{Rb} = I_c, V_{Cmod} = V_{ref} \text{ or; } \frac{V_{ref}}{R_b} = d_{mod} \frac{V_{dd} - V_{ref}}{R_c} \quad (8)$$

or taking into account that the reference voltage 364 is part of supply voltage:

$$V_{ref} = k_d V_{dd}; k_d = \frac{R_1}{R_1 + R_2} \quad (9)$$

The Equation (8) can be rewritten in the following form:

$$d_{mod} = \frac{R_c}{R_b} \frac{k_d}{1 - k_d} = \frac{1}{f_s R_b} \frac{k_d}{1 - k_d} \frac{1}{C_x} \quad (10)$$

The Equation (10) determines the minimum sensing capacitance value, which can be measured with the proposed method at given parameters set:

$$d_{mod} \leq 1, \text{ or:}$$

$$C_{xmin} = \frac{1}{f_s R_b} \frac{k_d}{1 - k_d} \quad (11)$$

The resolution of this method may be determined by the sigma-delta modulator duty cycle measurement resolution, which is represented in the following equations:

$$\Delta d_{mod} = \beta \frac{\Delta C_x}{C_x^2} \quad (12)$$

$$\beta = \frac{1}{f_s R_b} \frac{k_d}{1 - k_d}$$

or after rewriting relatively $\Delta C_x$, we obtain:

$$\Delta C_x = \frac{1}{\beta} \Delta d_{mod} C_x^2 \quad (13)$$

In one exemplary embodiment, the resistance of the bias resistor 365 is 20 k ohms ($R_b$=20 k), the operation frequency of the switches is 12 MHz ($f_s$=12 MHz), the capacitance on the switching capacitor 351 is 15 picofarads ($C_x$=15 pF), and the ratio between Vdd 366 and the voltage reference 364 is 0.25 ($k_d$=0.25), the duty cycle has a 12-bit resolution and the capacitance resolution is 0.036 pF.

In some embodiments of capacitive sensing applications, it may be important to get fast data measurements. For example, the modulator can operate at sample frequency 10 MHz (period is 0.1 microseconds (µs)), for the 12-bit resolution sample, and digital filter as single-type integrator/counter the measurement time is approximately 410 µs (e.g., $2^{12}$*0.1 µs=410 µs). For faster measurement speeds at same resolutions, other types of digital filters may be used, for example, by using the Sinc2 filter, the scanning time at the same resolution may be reduced approximately 4 times. To do this the sensing method should have suitable measurement speed. In one embodiment, a good measurement rate may be accomplished by using a double integrator as the digital filter 390.

Figure 4:
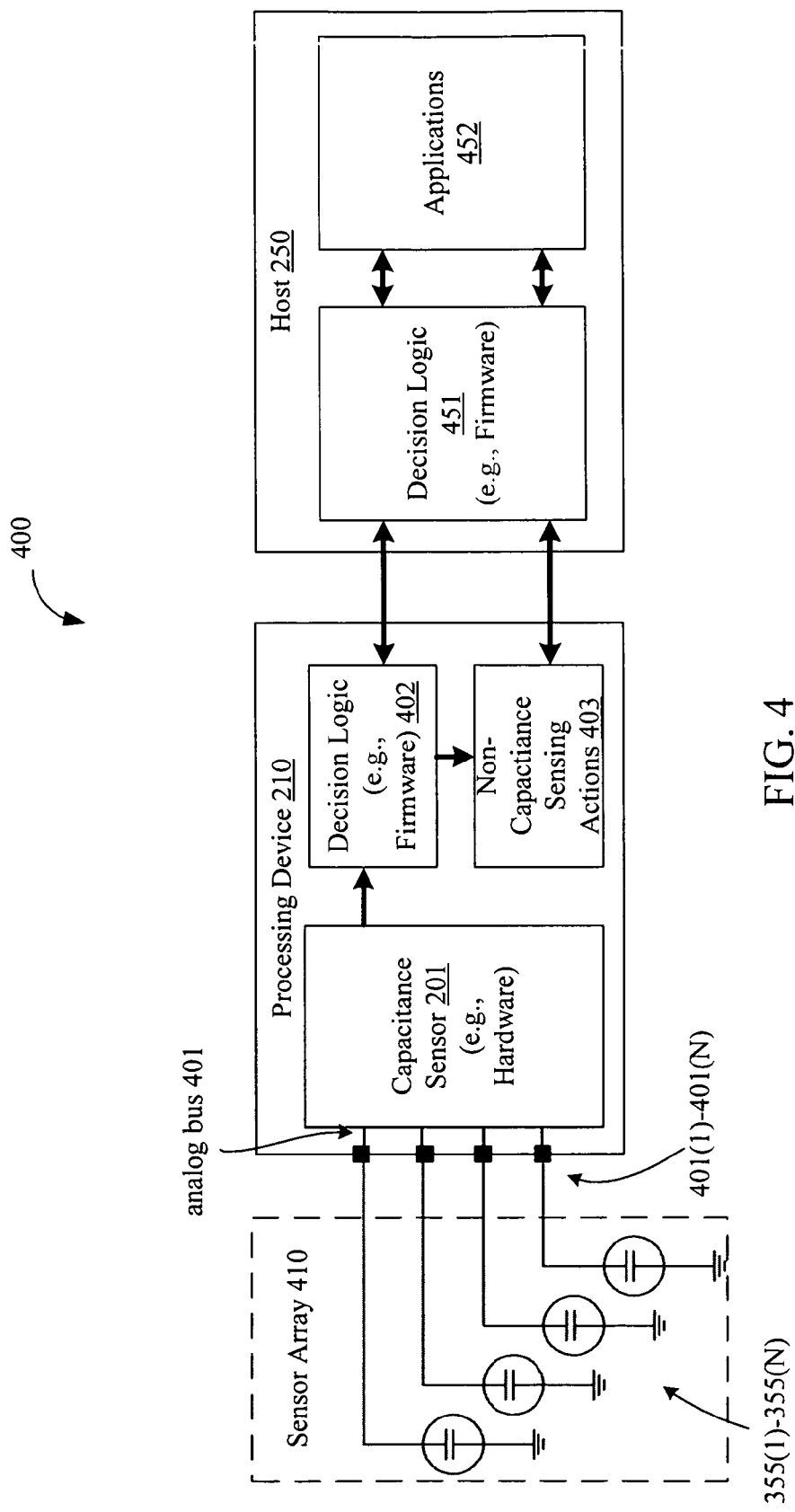
FIG. 4 illustrates a block diagram of one embodiment of an electronic device including a processing device that includes capacitance sensor for measuring the capacitance on a sensor array.

FIG. 4 illustrates a block diagram of one embodiment of an electronic device 400 including a processing device that includes capacitance sensor 201 for measuring the capacitance on a sensor array 410. The electronic device 400 of FIG. 4 includes a sensor array 410, processing device 210, and host 250. Sensor array 410 includes sensor elements 355(1)-355(N), where N is a positive integer value that represents the number of rows (or alternatively columns) of the sensor array 410. Each sensor element is represented as a capacitor, as described above with respect to FIG. 3B. In one embodiment, the sensor array 410 is an array of touch-sensor buttons of a keypad. Alternatively, the sensor array 410 may be an array of touch-sensor buttons on a touch panel. The sensor array 410 is coupled to processing device 210 via an analog bus 401 having multiple pins 401(1)-401(N). In one embodiment, the sensor array 410 may be a single-dimension sensor array including the sensor elements 355(1)-355(N), where N is a positive integer value that represents the number of sensor elements of the single-dimension sensor array. The single-dimension sensor array 410 provides output data to the analog bus 401 of the processing device 210 (e.g., via lines 231). Alternatively, the sensor array 410 may be a two-dimension sensor array including the sensor elements 355(1)-355(N), where N is a positive integer value that represents the number of sensor elements of the two-dimension sensor array. The two-dimension sensor array 410 provides output data to the analog bus 401 of the processing device 210 (e.g., via bus 221).

In one embodiment, the capacitance sensor 201 includes a selection circuit (not illustrated). The selection circuit is coupled to the sensor elements 355(1)-355(N) and the sensing circuitry of the capacitance sensor 201. Selection circuit may be used to allow the capacitance sensor to measure capacitance on multiple sensor elements (e.g., rows or columns). The selection circuit may be configured to sequentially select a sensor element of the multiple sensor elements to provide the charge current and to measure the capacitance of each sensor element. In one exemplary embodiment, the selection circuit is a multiplexer array. Alternatively, the selection circuit may be other circuitry inside or outside the capacitance sensor 201 to select the sensor element to be measured. In another embodiment, one capacitance sensor 201 may be used to measure capacitance on all of the sensor elements of the sensor array. Alternatively, multiple capacitance sensors 201 may be used to measure capacitance on the sensor elements of the sensor array. The multiplexer array may also be used to connect the sensor elements that are not being measured to the system ground. This may be done in conjunction with a dedicated pin in the GP10 port 207.

In another embodiment, the capacitance sensor 201 may be configured to simultaneously sense the sensor elements, as opposed to being configured to sequentially scan the sensor elements as described above. For example, the sensing device may include a sensor array having multiple rows and columns. The rows may be sensed simultaneously, and the columns may be sensed simultaneously.

In one exemplary embodiment, the voltages on all of the rows of the sensor array are simultaneously varied, while the voltages of the columns are held at a constant voltage, with the complete set of sampled points simultaneously giving a profile of the conductive object in a first dimension. Next, the voltages on all of the rows are held constant, while the voltages on all the rows are simultaneously varied, to obtain a complete set of sampled points simultaneously giving a profile of the conductive object in the other dimension.

In another exemplary embodiment, the voltages on all of the rows of the sensor array are simultaneously varied in a positive direction, while the voltages of the columns are varied in a negative direction. Next, the voltages on all of the rows of the sensor array are simultaneously varied in a negative direction, while the voltages of the columns are varied in a positive direction. This technique doubles the effect of any transcapacitance between the two dimensions, or conversely, halves the effect of any parasitic capacitance to the ground. In both methods, the capacitive information from the sensing process provides a profile of the presence of the conductive object to the sensing device in each dimension. Alternatively, other methods for scanning known by those of ordinary skill in the art may be used to scan the sensing device.

In one embodiment, the processing device 210 further includes a decision logic block 402. The operations of decision logic block 402 may be implemented in firmware; alternatively, it may be implemented in hardware or software. The decision logic block 402 may be configured to receive the digital code or counts from the capacitance sensor 201, and to determine the state of the sensor array 410, such as whether a conductive object is detected on the sensor array, where the conductive object was detected on the sensor array (e.g., determining the X-, Y-coordinates of the presence of the conductive object), determining absolute or relative position of the conductive object, whether the conductive object is performing a pointer operation, whether a gesture has been recognized on the sensor array 410 (e.g., click, double-click, movement of the pointer, scroll-up, scroll-down, scroll-left, scroll-right, step Back, step Forward, tap, push, hop, zigzag gestures, or the like), or the like.

In another embodiment, instead of performing the operations of the decision logic 402 in the processing device 210, the processing device 201 may send the raw data to the host 250, as described above. Host 250, as illustrated in FIG. 4, may include decision logic 451. The operations of decision logic 451 may also be implemented in firmware, hardware, and/or software. Also, as described above, the host may include high-level APIs in applications 452 that perform routines on the received data, such as compensating for sensitivity differences, other compensation algorithms, baseline update routines, start-up and/or initialization routines, interpolations operations, scaling operations, or the like. The operations described with respect to the decision logic 402 may be implemented in decision logic 451, applications 452, or in other hardware, software, and/or firmware external to the processing device 210.

In another embodiment, the processing device 210 may also include a non-capacitance sensing actions block 403. This block may be used to process and/or receive/transmit data to and from the host 250. For example, additional components may be implemented to operate with the processing device 210 along with the sensor array 410 (e.g., keyboard, keypad, mouse, trackball, LEDs, displays, or the like).

At startup (or boot) the sensor elements (e.g., capacitors 355(1)-(N)) are scanned and the digital code or count values for each sensor element with no activation are stored as a baseline array ($C_P$). The presence of a finger on the sensor element is determined by the difference in counts between a stored value for no sensor element activation and the acquired value with sensor element activation, referred to here as $\Delta n$. The sensitivity of a single sensor element is approximately:

$$\frac{\Delta n}{n} = \frac{C_F}{C_P} \qquad (14)$$

The value of $\Delta n$ should be large enough for reasonable resolution and clear indication of sensor element activation. This drives sensor element construction decisions. $C_F$ should be as large a fraction of $C_P$ as possible. Since $C_F$ is determined by finger area and distance from the finger to the sensor element's conductive traces (through the over-lying insulator), the baseline capacitance $C_P$ should be minimized. The baseline capacitance $C_P$ includes the capacitance of the sensor element pad plus any parasitics, including routing and chip pin capacitance.

In sensor array applications, variations in sensitivity should be minimized. If there are large differences in $\Delta n$, one sensor element may activate at 1.0 cm, while another may not activate until direct contact. This presents a non-ideal user interface device. There are numerous methods for balancing the sensitivity. These may include precisely matching on-board capacitance with PCB trace length modification, adding balance capacitors on each sensor element's PCB trace, and/or adapting a calibration factor to each sensor element to be applied each time the sensor element is measured.

In one embodiment, the PCB design may be adapted to minimize capacitance, including thicker PCBs where possible. In one exemplary embodiment, a 0.062 inch thick PCB is used. Alternatively, other thicknesses may be used, for example, a 0.015 inch thick PCB.

Sliding sensor elements may be used for control requiring gradual or discrete adjustments. Examples include a lighting control (dimmer), temperature control, volume control, graphic equalizer, and speed control. Slider controls may also be used for scrolling functions in menus of data. These sensor elements may be mechanically adjacent to one another. Activation of one sensor element results in partial activation of physically adjacent sensor elements. The actual position in the sliding sensor element is found by computing the centroid location of the set of sensor elements activated.

In applications for touch-sensor sliders (e.g., sliding sensor elements) and touch-sensor pads it is often necessary to determine finger (or other capacitive object) position to greater resolution than the native pitch of the individual sensor elements. The contact area of a finger on a sliding sensor element or a touch-pad is often larger than any single sensor element. In one embodiment, in order to calculate the interpolated position using a centroid, the array is first scanned to verify that a given sensor element location is valid. The requirement is for some number of adjacent sensor element signals to be above a noise threshold. When the strongest signal is found, this signal and those immediately adjacent are used to compute a centroid:

$$Centroid = \frac{n_{i-1} \cdot (i-1) + n_i i + n_{i+1} \cdot (i+1)}{n_{i-1} + n_i i + n_{i+1}} \qquad (15)$$

The calculated value may be fractional. In order to report the centroid to a specific resolution, for example a range of 0 to 100 for 12 sensor elements, the centroid value may be multiplied by a calculated or predetermined scalar. It may be more efficient to combine the interpolation and scaling operations into a single calculation and report this result directly in the desired scale. This may be handled in the high-level APIs. Alternatively, other methods may be used to interpolate the position of the conductive object.

A physical touchpad assembly is a multi-layered module to detect a conductive object. In one embodiment, the multi-layer stack-up of a touchpad assembly includes a PCB, an adhesive layer, and an overlay. The PCB may include the processing device 210 and other components, such as the connector to the host 250, necessary for operations for sensing the capacitance. These components may be on the non-sensing side of the PCB. The PCB may also includes the sensor array on the opposite side; i.e., the sensing side of the PCB. Alternatively, other multi-layer stack-ups may be used in the touchpad assembly.

The PCB may be made of standard materials, such as FR4 or Kapton™ (e.g., flexible PCB). Alternatively, the PCB may be made of non-flexible PCB material. In either case, the processing device 210 may be attached (e.g., soldered) directly to the sensing PCB (e.g., attached to the non-sensing side of the PCB). The PCB thickness varies depending on multiple variables, including height restrictions and sensitivity requirements. In one embodiment, the PCB thickness is at least approximately 0.3 millimeters (mm). Alternatively, the PCB may have other thicknesses. It should be noted that thicker PCBs may yield improved sensitivity. The PCB length and width is dependent on individual design requirements for the device on which the sensing device is mounted, such as a notebook or mobile handset.

The adhesive layer may be directly on top of the PCB sensing array and is used to affix the overlay to the overall touchpad assembly. Typical material used for connecting the overlay to the PCB is non-conductive adhesive such as 3M 467 or 468. In one exemplary embodiment, the adhesive thickness is approximately 0.05 mm. Alternatively, the adhesive may be present on the bottom or back side of the overlay, and other thicknesses may be used. The overlay may also be provided initially in liquid form as a spray-on, spun-on, or dipped coating, which is later cured to a solid non-conductive form.

The overlay may be non-conductive material used to protect the PCB circuitry from environmental conditions and ESD, and to insulate the user's finger (e.g., conductive object) from the circuitry. Overlay can be ABS plastic, polycarbonate, glass, or polyester film, such as Mylar™ polyester film. Alternatively, other materials known by those of ordinary skill in the art may be used. In one exemplary embodiment, the overlay has a thickness of approximately 1.0 mm. In another exemplary embodiment, the overlay thickness has a thickness of approximately 2.0 mm. Alternatively, other thicknesses may be used.

The sensor array may be a grid-like pattern of sensor elements (e.g., capacitive elements) used in conjunction with the processing device 210 to detect a presence of a conductive object, such as a finger, to a resolution greater than that which is native. The touch-sensor pad layout pattern may be disposed to maximize the area covered by conductive material, such as copper, in relation to spaces necessary to define the rows and columns of the sensor array.

Figure 5A:
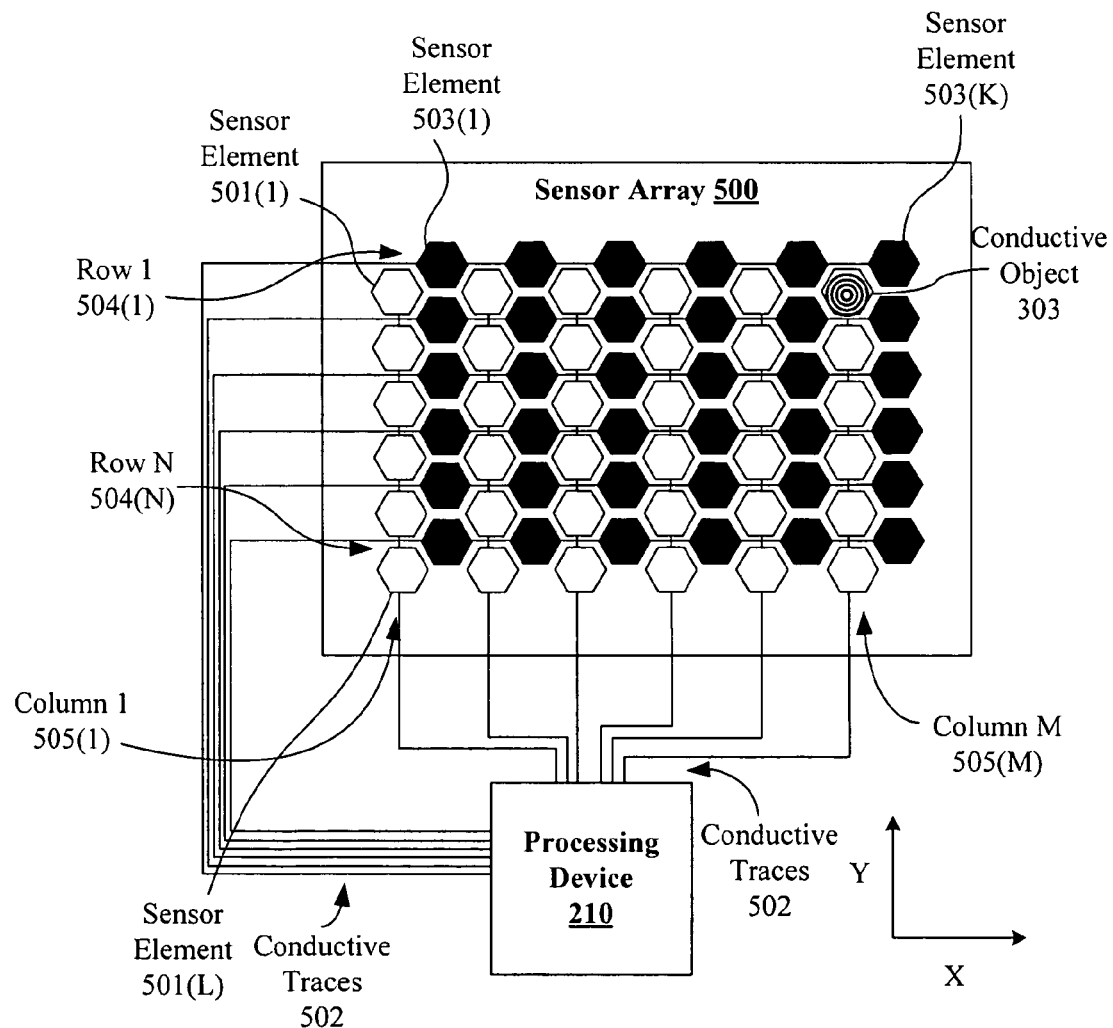
FIG. 5A illustrates a top-side view of one embodiment of a sensor array of sensor elements for detecting a presence of a conductive object on the sensor array of a touch-sensor pad.

FIG. 5A illustrates a top-side view of one embodiment of a sensor array of sensor elements for detecting a presence of a conductive object 303 on the sensor array 500 of a touch-sensor pad. Sensor array 500 includes rows 504(1)-504(N) and columns 505(1)-505(M), where N is a positive integer value representative of the number of rows and M is a positive integer value representative of the number of columns. Each row includes sensor elements 503(1)-503(K), where K is a positive integer value representative of the number of sensor elements in the row. Each column includes sensor elements 501(1)-501(L), where L is a positive integer value representative of the number of sensor elements in the column. Accordingly, the sensor array is an N×M sensor matrix. The N×M sensor matrix, in conjunction with the processing device 210, is configured to detect a position of a presence of the conductive object 303 in the x-, and y-directions. In one embodiment, the sensor array is a 1×M or N×1 sensor matrix that can be configured to operate as a touch-sensor slider.

Figure 5B:
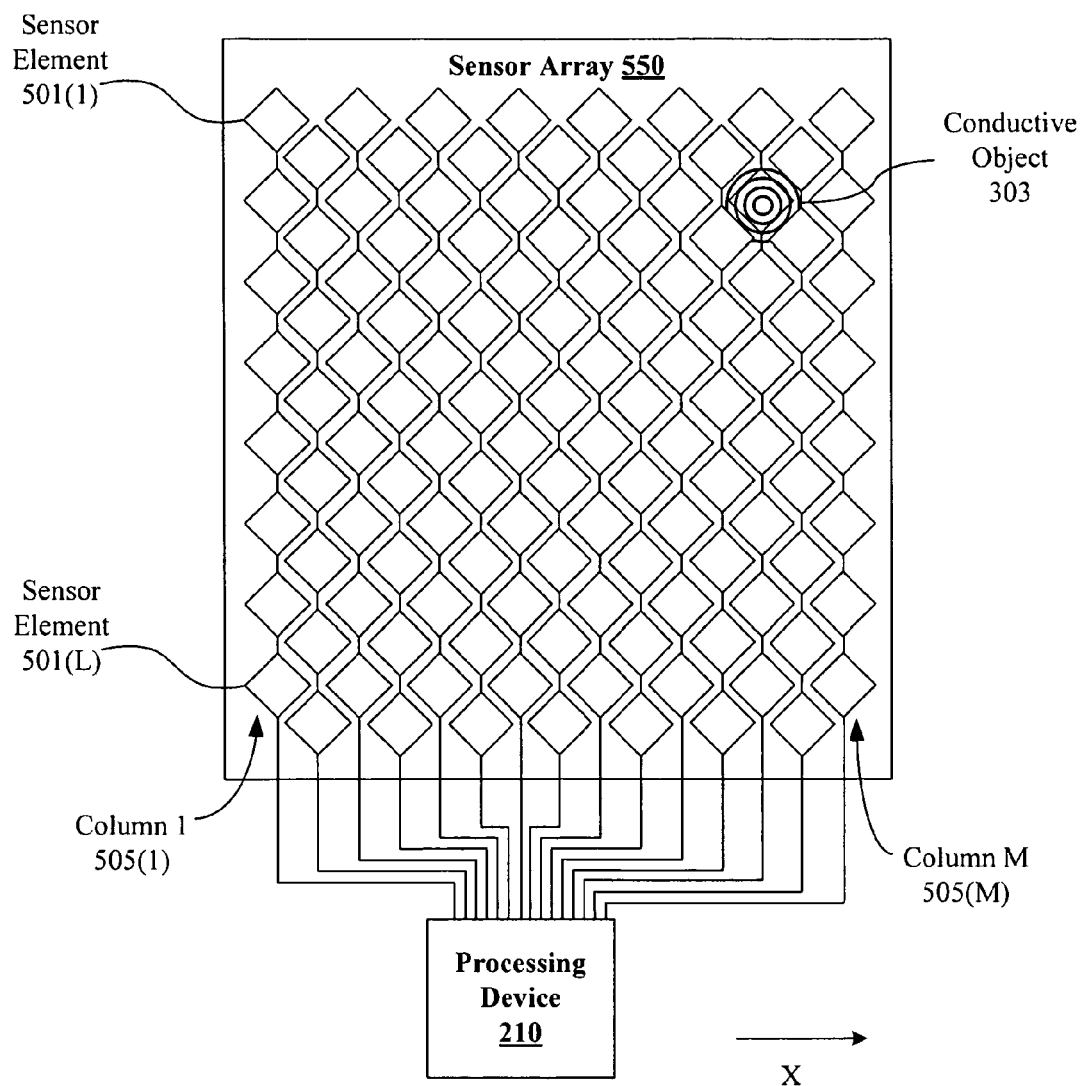
FIG. 5B illustrates a top-side view of one embodiment of a sensor array of sensor elements for detecting a presence of a conductive object on the sensor array of a touch-sensor slider.

FIG. 5B illustrates a top-side view of one embodiment of a sensor array of sensor elements for detecting a presence of a conductive object 303 on the sensor array 550 of a touch-sensor slider. Sensor array 550 includes columns 505(1)-505(M), where M is a positive integer value representative of the number of columns. Each column includes sensor elements 501(1)-501(L), where L is a positive integer value representative of the number of sensor elements in the column. Sensor array is a 1×M sensor array. The 1×M sensor array, in conjunction with the processing device 210, is configured to detect a position of a presence of the conductive object 303 in the x-direction. It should be noted that sensor array 500 may be configured to function as a touch-sensor slider 230.

Alternating sensor elements in FIG. 5A correspond to x- and y-axis elements. The y-axis sensor elements 503(1)-503(K) for each row 504(1)-504(N) are illustrated as black hexagons in FIG. 5A, and the x-axis sensor elements 501(1)-501(L) for each column 505(1)-505(M) are illustrated as white hexagons in FIG. 5A. It should be noted that other shapes may be used for the sensor elements, such as diamonds (as illustrated in FIG. 5B) or the like. In another embodiment, the columns and rows may include vertical and horizontal bars (e.g., rectangular shaped bars); however, this design may include additional layers in the PCB to allow the vertical and horizontal bars to be positioned on the PCB so that they are not in contact with one another.

Figure 5C:
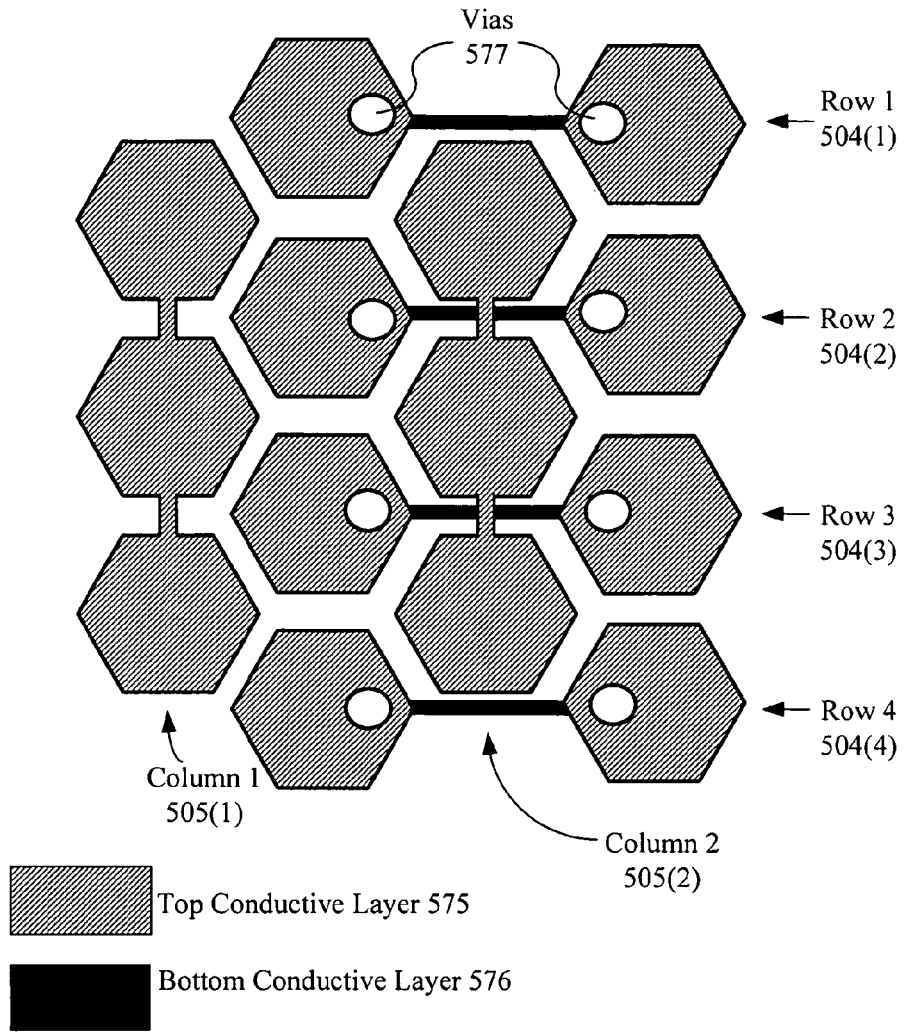
FIG. 5C illustrates a top-side view of one embodiment of a two-layer touch-sensor pad.
Figure 5D:
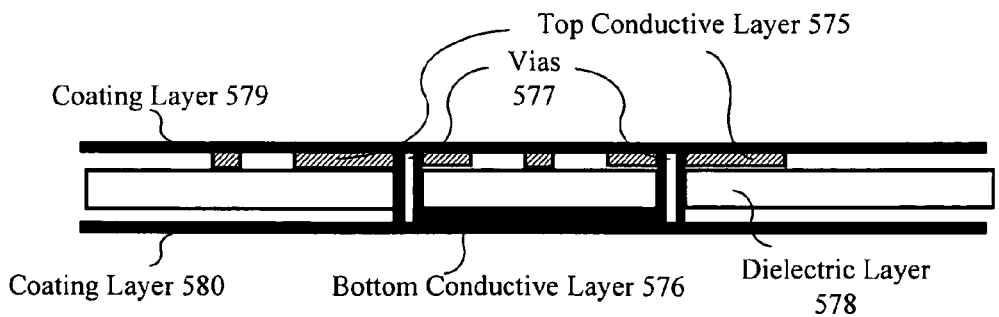
FIG. 5D illustrates a side view of one embodiment of the two-layer touch-sensor pad of FIG. 5C.

FIGS. 5C and 5D illustrate top-side and side views of one embodiment of a two-layer touch-sensor pad. Touch-sensor pad 220, as illustrated in FIGS. 5C and 5D, includes a portion of the first two columns 505(1) and 505(2), and the first four rows 504(1)-504(4) of sensor array 500. The sensor elements of the first column 505(1) are connected together in the top conductive layer 575, illustrated as hashed hexagonal sensor elements and hashed interconnecting traces. The sensor elements of the second column 505(2) are similarly connected in the top conductive layer 575. The hexagonal sensor elements of each column, in effect, form a chain of elements. The sensor elements of the first row 504(1) are connected together in the bottom conductive layer 576 using vias 577, illustrated as hashed hexagonal sensor elements and black interconnecting traces. The sensor elements of the second, third, and fourth rows 504(2)-504(4) are similarly connected in the bottom conductive layer 576, illustrated as hashed hexagonal sensor elements and black interconnecting traces. The hexagonal sensor elements of each row, in effect, form a chain of elements. It should be noted that other shapes may be used for the sensor elements, such as diamonds (as illustrated in FIG. 5B) or the like.

As illustrated in FIG. 5D, the top conductive layer 575 includes the sensor elements for both the columns and the rows of the sensor array, as well as the connections between the sensor elements of the columns of the sensor array. The bottom conductive layer 576 includes the conductive paths that connect the sensor elements of the rows that reside in the top conductive layer 575. The conductive paths between the sensor elements of the rows use vias 577 to connect to one another in the bottom conductive layer 576. Vias 577 go from the top conductive layer 575, through the dielectric layer 578, to the bottom conductive layer 576. Coating layers 579 and 580 are applied to the surfaces opposite to the surfaces that are coupled to the dielectric layer 578 on both the top and bottom conductive layers 575 and 576.

It should be noted that the space between coating layers 579 and 580 and dielectric layer 578, which does not include any conductive material, may be filled with the same material as the coating layers or dielectric layer. Alternatively, it may be filled with other non-conductive materials.

It should be noted that the present embodiments are not be limited to connecting the sensor elements of the rows using vias to the bottom conductive layer 576, but may include connecting the sensor elements of the columns using vias to the bottom conductive layer 576. Furthermore, the present embodiments are not limited two-layer configurations, but may include disposing the sensor elements on multiple layers, such as three- or four-layer configurations. In another embodiment, the present embodiments may be implemented in a 1-layer configuration.

When sensor elements are not being sensed, they may be connected to ground. By surrounding the sensing device (e.g., touch-sensor pad) with a ground plane, the perimeter elements have the same fringe capacitance to ground as the interior elements. Alternatively, the individual sensor elements may be surrounded by a ground plane.

In one embodiment, an IC including the processing device 210 may be directly placed on the non-sensing side of the PCB. This placement does not necessarily have to be in the center. The processing device IC is not required to have a specific set of dimensions for a touch-sensor pad, nor a certain number of pins. Alternatively, the IC may be placed somewhere external to the PCB, or on the same side as the sensing surface but in an offset location that does not interfere with the sensing of the conductive object 303.

FIG. 6A illustrates one embodiment of a keypad sensing device 600, which includes multiple feedback zones to determine a particular feedback to be provided to the user that corresponds to the position of the conductive object on the keypad sensing device. Keypad sensing device 600 includes multiple buttons or keys, which are represented by the effective button locations 601 on the sensing device 600. In particular, the keypad sensing device 600 includes twelve keys, keys '1'-'9', '*', and '#' as found on most keypads for telephones, including mobile handsets. The keypad sensing device 600 may be located on a mobile handset, or alternatively on other electronic devices that include buttons or keys. Although in this embodiment, there are twelve keys, alternatively, the keypad may include more or less keys than twelve. For example, the keypad may include the twelve keys, as illustrated in FIG. 6A, and additional control buttons for menu navigation and other operations typical of electronic devices. The embodiments may also be implemented in keyboards, or other electronic devices that include a home key or reference key, or alternatively an electronic device that includes a touchpad or slider, which has a reference location on the pad or slider. The embodiments described herein may also be implemented in devices that do not include a specific home key or reference key. These devices may use active verbal feedback to indicate where the finger is located on the device. The active verbal feedback may be recorded or synthesized speech. Using this type of audio feedback, each feedback zone may provide a different audio feedback to the user such that a single home key or button location is not needed. In other words, each button or key may effectively use all the other feedback zones to provide reference detection capability for its own location. For example, if a person is looking for the number 2 ('2' key), and the current audio feedback given to the user is stating 'three,' the user knows that the '2' key is to the left of the current position of the finger. Using such configuration, it is not necessary that the user locate the '5' key position first.

Keypad sensing device 600 may be a piece of circuit board with a sensing array similar to the circuit illustrated in FIG. 5A, having an overlay with numbers or other icons imprinted on or molded into its surface. Alternately, the keypad sensing device 600 may be a transparent sensing array placed over a static or dynamic display. The effective button locations 601(1)-601(12) may be defined as specific locations or regions of the surface area of the touchpad. In another embodiment, the sensor array may include a sensor element for each effective button location 601. In another embodiment, the effective button locations 601(1)-601(12) of the keypad sensing device 600 are implemented using individual touch-sensor buttons; one touch-sensor button for each effective button location 601. Alternatively, other capacitance sensing configurations may be used to implement the effective button locations 601. In another embodiment, the effective button locations 601, associated feedback zones 602, and associated active feedback types are dynamically allocated as the mode of the device changes. For example, in a touch screen application, a user may browse through multiple menus where the screen content changes, which may change the associated button locations on the touch screen. A touch screen may be configured to change from a number pad to an alphanumeric keypad, for example. The processing device 210 is configured to scan the sensor array, determining if a conductive object (e.g., finger) is present, calculating the centroid of the conductive object, and comparing the calculated location to boundaries identified as the button locations 601 and/or feedback zones 602, and determining if the activation is a touch, press, or tap. The feedback zones 602 of the keypad sensing device 600 may be numerically defined regions within the firmware or software running in the processing device 210.

When a presence of a conductive object is detected in one of the effective button locations 601, the processing device 210 may determine whether the corresponding key has been activated (e.g., pressed). For example, if the presence of the conductive object is detected above or in direct contact with the effective button location 601(1), or is recognized as a tap gesture within the effective button location 601(1), the processing device may determine that the user has activated the '1' key.

Like each of the effective button locations 601 corresponds to a particular key or button, each of the effective button locations 601 corresponds to a feedback zone 602. The feedback zones 602 are used to determine a particular feedback to be provided to the user that corresponds to a position of the conductive object on the keypad sensing device. For example, feedback zone 602(1), which corresponds to effective button location 601(1), when activated by the user, activates an active feedback to the user for the '1' key. The active feedback may be in the form of a vibration, a tone, a sound (e.g., click, snap, clang, horn, dog bark, siren, whistle, or the like), recognizable and understandable speech or song, alight, any combination thereof, or the like.

The processing device 210 is configured to determine whether a particular feedback zone (e.g., 602(1)) and/or effective button location (e.g., 601(1) has been activated on the keypad sensing device 600. In response, the processing device 210 may activate an active feedback mechanism, such as a vibrator, speaker, light source, any combination thereof, or the like, to provide the particular active feedback that corresponds to the feedback zone and/or effective button location that has been activated.

In one embodiment, the processing device 210 is configured to allow the feedback zones 602 to be activated without activation of the corresponding button or key. In one embodiment, the processing device 210 is configured to generate a signal to enable active feedback corresponding to the feedback zone within which the conductive object is detected, without generating a signal that indicates that the particular button has been activated that corresponds to the effective button location within which the conductive object is detected. For example, when a presence of the conductive object is detected within the feedback zone 602(1), the processing device 210 activates or controls an active feedback mechanism to provide the active feedback that corresponds to the feedback zone 602(1) and the effective button location 601(1), which may or may not be activated. The button may be activated if for example, the user presses the conductive object against the effective button location 601 with greater force, or for a period of time that is greater than some predetermined threshold time. In one embodiment, two thresholds may be used to detect the presence of the conductive object for purpose of providing active feedback and to detect the presence of the conductive object for purpose of determining activation of a particular button or key (also known as button activation or button press).

The feedback zones 602 may be used to determine a particular active feedback corresponding to a position of the conductive object, manipulated by a user, which allows detection of a reference location (e.g., home key) on the sensing device by the user. In one embodiment, the processing device determines the active feedback to be provided to the user (e.g., via an active feedback mechanism) using the activation of a particular feedback zone. Alternatively, the processing device may be configured to determine the particular active feedback to be provided to the user by determining the position of the presence of the conductive object, and determining that the position is within the particular feedback zone. In response to determining which particular feedback zone has been activated, the processing device activates or controls the active feedback mechanism to provide the corresponding feedback associated with the particular feedback zone for a particular key. The particular active feedback to be provided to the user may be determined with or without activation of the particular key.

In one embodiment, the effective button locations 601(1)-601(12) are implemented using a sensor array of a touchpad. The effective button locations 601(1)-601(12) may be defined as specific locations or regions of the surface area of the touchpad. In another embodiment the locations of these effective button locations 601(1)-612(12) may be dynamically allocated as the operating mode of the device changes, as described above. In another embodiment, the sensor array may include a sensor element for each effective button location 601. In another embodiment, the effective button locations 601(1)-601(12) of the keypad sensing device 600 are implemented using individual touch-sensor buttons; one touch-sensor button for each effective button location 601. Alternatively, other capacitance sensing configurations may be used to implement the effective button locations 601.

Similarly, the feedback zones 602(1)-601(12) may be implemented as defined areas on a sensor array, such as a sensor array of a touchpad, that correspond to the effective button locations 601. Alternatively, the feedback zones 602(1)-601(12) may correspond to individual touch-sensor buttons used for each effective button location.

In one embodiment, the feedback zones 602(1)-602(12) correspond one-to-one to the effective button locations 601(1)-601(12), such as illustrated in FIG. 6A. Alternatively, the feedback zones may be more or less than the number of effective button locations 601(1)-601(12). For example, in one embodiment, such as illustrated in FIG. 6B, there may be two feedback zones 602(13) and 602(14), one feedback zone 602(13) that corresponds to the home key, such as the '5' key, and one feedback zone 602(14) that corresponds to all the other keys, such as the '1'-'4', '6'-'9', and '#' and '*' keys. The two feedback zones 602(13) and 602(14) may be used to determine the particular active feedback to be provided to a user for manipulating a conductive object on the keypad, and for determining the particular active feedback to be provided to a user to allow the user to determine a reference location, e.g., home key (e.g., '5' key). The active feedback may increase or decrease in magnitude, frequency, duration, or any combination thereof of audio tones, verbal message, vibrations, light, or any combination thereof as the conductive object activates the two different feedback zones 602(13)-602(14). For example, the active feedback generated by activating the feedback zone 602(14) may be one or more vibrations at a first frequency, and the active feedback generated by activating the feedback zone 602(13) may be one or more vibrations at a second frequency. In this embodiment, the first and second frequencies may include a difference in frequencies that is easily perceived by the user to detect when the conductive object is on the effective button location 601(5), which corresponds to the home key (e.g., '5' key).

In another embodiment, as an activating member (e.g., conductive object manipulated by the user) is moved across the surface of the sensing device, it crosses one or more feedback zones 602. As the calculated centroid of the activating member passes from one feedback zone into another, the associated feedback to the user changes, allowing the user to identify the respective effective button locations. In another embodiment, the change in feedback allows the user to identify the boundaries of each respective effective button location. Using the changes in the active feedback, the user can infer the approximate center of each effective button location on the sensing device. This may be done using multiple different combinations of vibration, sound, verbal message, or light. The user may manually determine where the reference location is located on the sensing device, using various motions of the activating member across the surface of the sensing device. Alternatively, using the changes in the active feedback, the user can detect the reference location, instead of inferring the reference location. This may be done by providing a different active feedback when the centroid of the activating member is detected within the feedback zone that corresponds to the reference location, such as the feedback zone that corresponds to the '5' key.

In one embodiment, an additional indication may be provided to the user of the boundaries of the effective button locations by stopping all feedback during zone crossing events. In one embodiment, as the conductive object crosses a boundary, no active feedback is provided to the user. This may be beneficial when one or more effective button locations have the same active feedback (e.g., feedback zone 602(14) of FIG. 6B and active feedback 712, 714, 715 of FIG. 7A). By providing no active feedback to the user when the conductive object crosses the boundaries of adjacent effective button locations, the isolation of adjacent effective button locations can be improved, which may reduce the potential for false activations.

In another embodiment, there may be more feedback zones 602 than the number of effective button locations 601. In one embodiment, the feedback zones 602 and the effective button locations 601 are rectangular or square. Alternatively, the feedback zones 602 and/or the effective button locations are other shapes, such as circles, ovals, hexagons, pentagons, octagons, or the like.

FIG. 6C illustrates one embodiment of a keypad sensing device, which includes five feedback zones to determine a particular feedback to be provided to the user that corresponds to the position of the conductive object on the keypad sensing device. Keypad sensing device 600 of FIG. 6C includes five feedback zones 602(15)-602(19). The first feedback zone 602(15), which corresponds to the home key or reference location, is surrounded by one or more feedback zones. The second feedback zone 602(16) is a circular feedback zone that surrounds the first feedback zone 602(15), feedback zone 602(17) is an oval feedback zone that surrounds the circular feedback zone 602(16), the feedback zone 602(18) is another circular feedback zone that surrounds the feedback zone 602(17), and the feedback zone 602(19) is a rectangular feedback zone that surrounds the feedback zone 602(18). The five feedback zones 602(15)-602(19) may be used to determine the particular active feedback to be provided to a user for manipulating a conductive object on the keypad, and for determining a reference location, e.g., home key (e.g., '5' key). The active feedback may increase or decrease in magnitude, frequency, duration, or any combination thereof of audio tones, vibrations, light, or any combination thereof, as the conductive object activates the five different feedback zones 602(15)-602(19). For example, the active feedback generated by activating the feedback zone 602(15) may be one or more vibrations at a first frequency, and the active feedback generated by activating the feedback zone 602(16)-602(19) may be one or more vibrations at different frequencies. In one embodiment, the frequency of the active feedback may decrease incrementally for each of the feedback zones 602(16)-602(19). In another embodiment, the frequency of the active feedback may increase incrementally for each of the feedback zones 602(16)-602(19). In another embodiment, the position of the presence of the conductive object is determined, and based on the position, a corresponding active feedback is generated. For example, as the conductive object is detected at the edge of the sensing device, the active feedback is at the lowest frequency, and as user responds to the active feedback, the user manipulates the conductive object towards the effective button location 601 (5). As the presence of the conductive object is detected closer to the effective button location 601(5), the frequency of the active feedback increases, either gradually or incrementally. The increase of frequency provides distinct active feedback to the user to eventually determine a reference location, effective button location 601(5) on the keypad sensing device 600, which corresponds to the home key (e.g., '5' key).

Figure 7A:
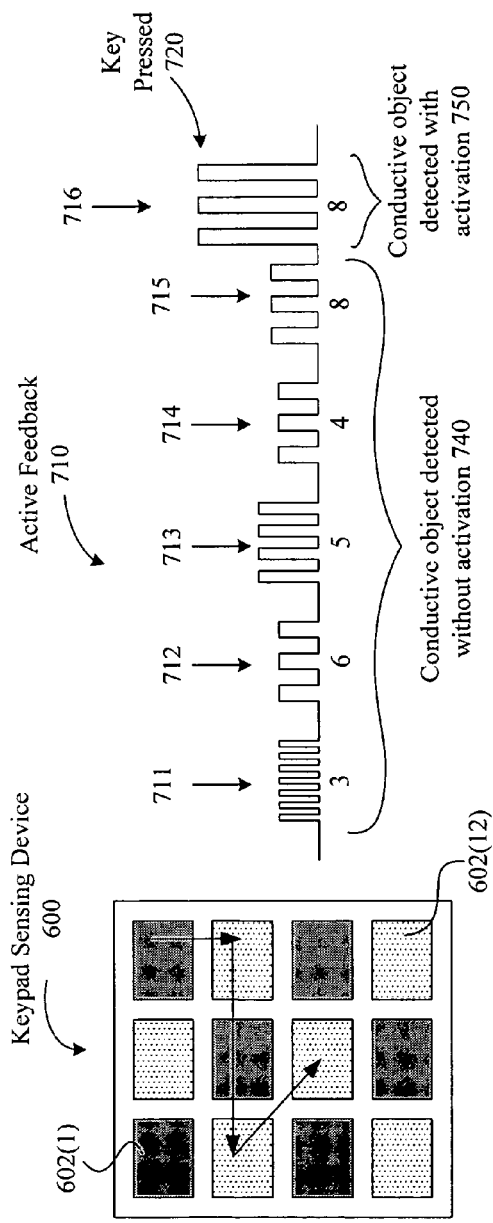
FIG. 7A illustrates a graph of one embodiment of an output of active feedback for an exemplary path of the conductive object across the surface of the sensing device of FIG. 6A.
Figure 7B:
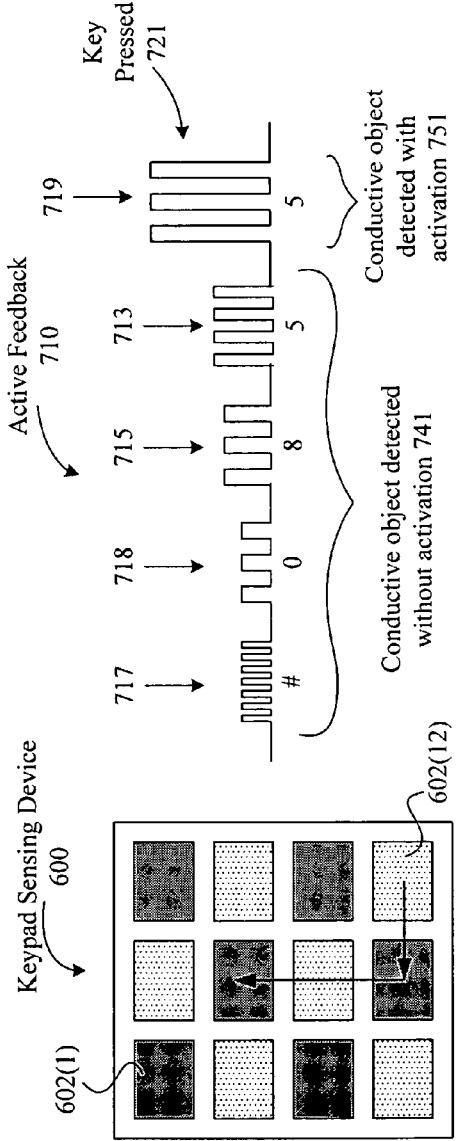
FIG. 7B illustrates a graph of another embodiment of an output of active feedback for another exemplary path of the conductive object across the surface of the sensing device of FIG. 6A.

FIG. 7A illustrates a graph of one embodiment of an output of active feedback from the keypad sensing device of FIG. 6A. As described above, when a presence of a conductive object is detected within one of the feedback zones 602, a corresponding active feedback 710 is generated. The active feedback 710 may be vibrational, audio, verbal message, thermal, or illuminating feedback, or any combination thereof. The presence of the conductive object may be detected with or without activation of the button that corresponds to one of the effective button locations 601 where the presence is detected, as illustrated in FIG. 7A and FIG. 7B as 740 and 750, and 741 and 751, respectively. In one embodiment, the sensing device 600 and processing device 210 are configured to activate the active feedback mechanism to provide an active feedback when detecting the presence of the conductive object without activation 740 (and 741 of FIG. 7B), and to provide a different active feedback when detecting the presence of the conductive object with activation 750 (and 751 of FIG. 7B). Alternatively, the same active feedback may be provided when the presence of the conductive object is detected with or without activation of the button that corresponds to effective button area where the presence of the conductive object was detected.

In the embodiment of FIG. 7A, the user manipulates the conductive object on the sensing device, starting at feedback zone 602(3), which corresponds to the '3' key (effective button location 601(3)). When the presence of the conductive object is detected in the feedback zone 602(3), the processing device 210 enables the active feedback 711 (e.g., vibrational, audio, verbal "three", or illuminating feedback). Active feedback 711 corresponds to the active feedback that allows the user to detect that the conductive object is on the '3' key (effective button location 601(3)). From the '3' key, the user manipulates the conductive object downward, where the presence of the conductive object is detected in the feedback zone 602(6). Consequently, the processing device 210 enables the active feedback 712, which corresponds to the active feedback that allows the user to detect that the conductive object is on the '6' key. From the '6' key, the user manipulates the conductive object to the left, where the presence of the conductive object is detected in the feedback zone 602(5). Consequently, the processing device 210 enables the active feedback 713, which corresponds to the active feedback that allows the user to detect that the conductive object is on the '5' key, the home key. Now that the user has detected that the conductive object is on the home key, the user has oriented the conductive object on the sensing device 600. Knowing the reference location or the location of the home key, the user may manipulate the conductive object to other keys on the keypad sensing device 600 without looking at the keypad sensing device 600 (e.g., for blind dialing). Knowing the reference location or the location of the home key, the user may manipulate the conductive object more accurately for proper button activation (e.g., activating the intended button). It should be noted that providing active feedback to the user for the different buttons, allows the user to detect a reference location on the keypad sensing device without the use of passive feedback mechanisms (e.g., mechanical, tactile feedback buttons) and/or surface features disposed on the surface of the buttons.

Once the user has detected that the conductive object is on the home key (e.g., oriented the conductive object on the sensing device 600), the user may manipulate the conductive object to other buttons on the keypad sensing device 600. Alternatively, if the active feedback is sufficiently different for each feedback zone that the user can determine their orientation on the key pad without location of the home key, the user may manipulate the conductive object in a more direct route that does not require prior location of the home key. For example, from the home key (e.g., '5' key), the user manipulates the conductive object left, where the presence of the conductive object is detected in the feedback zone 602(4). Consequently, the processing device 210 enables the active feedback 714, which corresponds to the active feedback that allows the user to detect that the conductive object is on the '4' key. From the '4' key, the user manipulates the conductive object downward and to the right, where the presence of the conductive object is detected in the feedback zone 602(8). Consequently, the sensing processing device 210 enables the active feedback 715, which corresponds to the active feedback that allows the user to detect that the conductive object is on the '8' key. Once the user has determined that the conductive object is on the '8' key, the user may activate the '8' key. Upon activating the '8' key, processing device 210 enables the active feedback 716, which corresponds to the active feedback that allows the user to know that the '8' key has been activated, key pressed 720. In one embodiment, the key pressed 720 occurs when the conductive object remains on the effective button location (e.g., effective button location 601(8)) for a period of time longer than a threshold time. Alternatively, the key pressed 720 may occur as a result of the user pressing the conductive object against the sensing device with greater force.

In one embodiment, the user may activate the button by increasing the capacitance measured on the sensing device. For example, the capacitance increases as the surface area of the conductive object that is in contact with the surface of the sensing device increase. For example, as a user places or rests his/her finger on the surface of the sensing device, the contacting surface area is one size, and when the user presses his/her finger on the surface of the sensing device, the contacting surface increases to a larger size, resulting in an increase of capacitance on the sensing device. In another embodiment, the user may activate the button by determining a pressure of the conductive object on the surface of the conductive object, and activating the button when the pressure exceeds a pressure threshold. Alternatively, other methods known by those of ordinary skill in the art may be used to determine button activation, such as recognizing a tap gesture to activate the button.

As described above, dissimilar active feedback may be provided to the user when the presence of the conductive object is detected and when the button is activated, such as active feedback 715 and active feedback 716. Alternatively, the same active feedback may be provided to the user when the presence of the conductive object is detected and when the button is activated.

FIG. 7A illustrates a graph of one embodiment of an output of active feedback for an exemplary path of the conductive object across the surface of the sensing device 600 of FIG. 6A. As the conductive object passes across each feedback zone 602, which each correspond to a specific effective button location, the vibration pattern changes as shown as active feedback 711, 712, 713, 714, and 715. It should be noted that feedback zones 602(6), 602(4), and 602(8) may all produce effectively the same frequency and amplitude of vibration in the active feedback 712, 714, and 716, while the feedback zone 602(5) for the reference location of the '5' key and the feedback zone 602(3) for the '3' key produce different patterns. At the end of the path of the conductive object, the user presses down while in the feedback zone 602(8) for the '8' key, causing detection of an activation event, which may be reported to the user as an increase in the amplitude of the vibration associated with that zone when in a non-activated state. In another embodiment, the active feedback may be audio, verbal message, light, or the like. Alternatively, different active feedback may be produced by each of the feedback zones 602, and for each of the activation events of the buttons while in each of the feedback zones 602.

FIG. 7B illustrates a graph of another embodiment of an output of active feedback for another exemplary path of the conductive object across the surface of the sensing device 600 of FIG. 6A. In this embodiment, the user manipulates the conductive object from the feedback zone 602(12), which corresponds to the effective button location 601(12) of the '#' key, to the '5' home key. Using the active feedback 717, 718, 715, and 713, the user can manipulate the conductive object to detect the reference location, '5' key to orient the conductive object on the sensing device. In this particular example, the user desires to activate the '5' key. Upon activating the '5' key, the processing device 210 enables the active feedback 719, which corresponds to the active feedback that allows the user to know that the '5' key has been activated, key pressed 721. The key pressed 721 may occur in response to one of the conditions described above with respect to key pressed 720.

Figure 8:
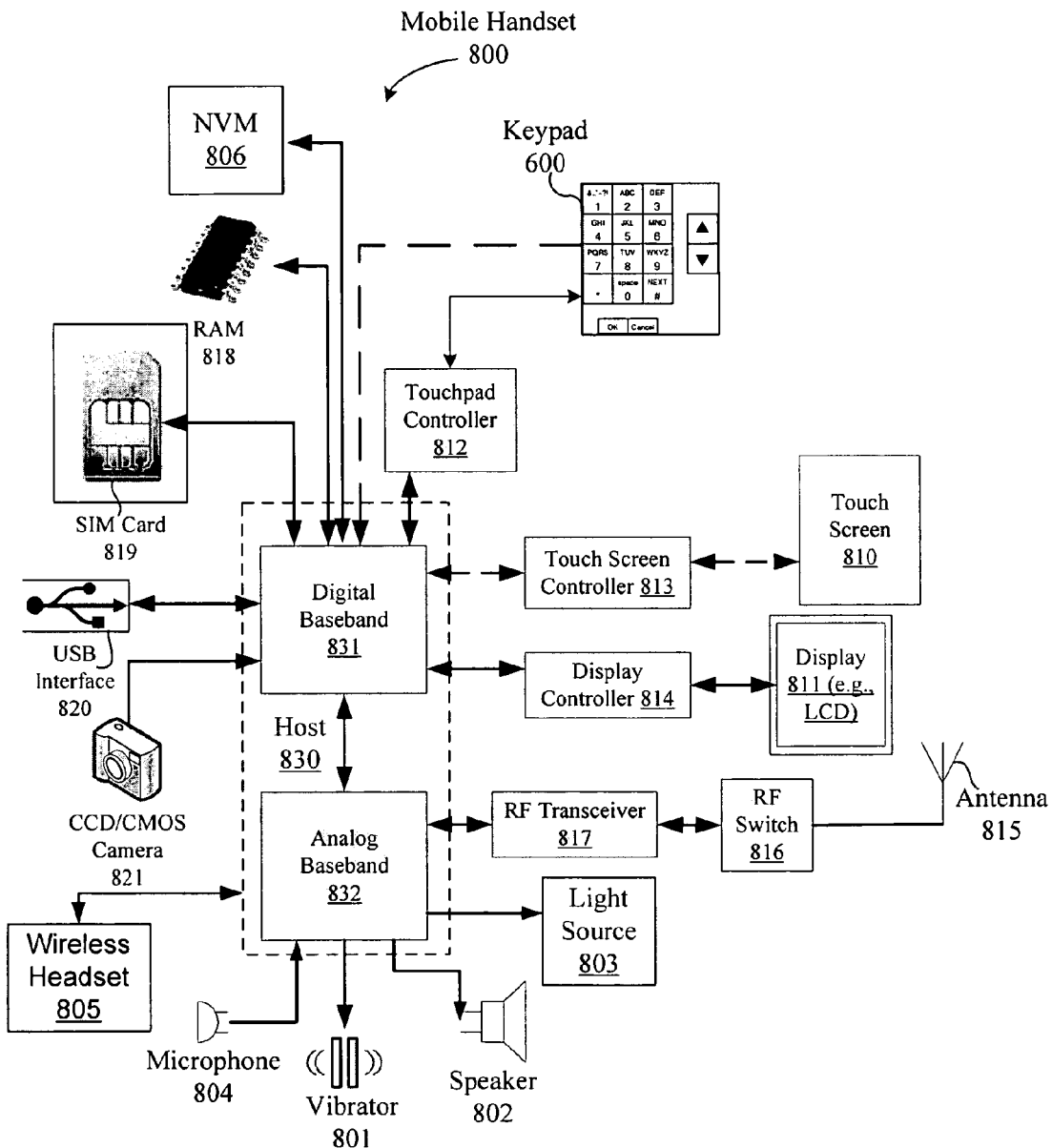
FIG. 8 illustrates a block diagram of one embodiment of a mobile handset, which includes components for providing active feedback to the user.

FIG. 8 illustrates a block diagram of one embodiment of a mobile handset, which includes components for providing active feedback to the user. Mobile handset 800 includes a host 830, which includes a digital baseband 831 and an analog baseband 832. The host 830 is configured to operate as a processing device for controlling and monitoring the operations of various peripheral components. The various peripheral components include RAM 818, SIM Card 819, non-volatile memory 806, USB interface 820, camera 821 (e.g., CCD/CMOS), vibrator 801, speaker 802, light source 803, microphone 804, wireless headset 805, keypad sensing device 600, as described above, a display 811 (e.g., LCD display), a touch screen 810, antenna 815, RF switch 816, and RF Transceiver 817. In one embodiment, the keypad sensing device 600 is coupled to a touchpad controller 812, the touch screen 810 is coupled to a touch screen controller 813, the display 811 (e.g., LCD display) is coupled to a display controller 814. The touchpad controller 812 may be processing device 210. Alternatively, the keypad sensing device 600 may be the touch screen 812, and the touch screen controller 813 may be processing device 210. Alternatively, the keypad sensing device 600 may be coupled directly to the host 830, where the host 830 performs the operations of the processing device 210. Alternatively, the touch screen 810 and display 811 are coupled directly to the host 830 without the use of individual controllers.

In one embodiment, the keypad sensing device 600 is the touchpad 220, as described herein, and is configured to operate in one of two or more modes. For example, the keypad sensing device 600 may operate either as a touch-sensor pad for x/y positioning and gesture recognition, as a keypad, or as other arrays of touch-sensor buttons or sliders. Alternatively, the keypad sensing device 600 may be configured to operate in the two or more modes, or the keypad sensing device 600 may also be configured to only operate as a keypad. In another embodiment, the keypad sensing device 600 is a graphical overlay that is positioned directly over the touch-sensor pad 220, and the processing device 210 detects the presence of the conductive object within each of the associated feedback zones of the touch-sensor pad 220 when in dialing mode, and also provide normal touchpad operations when not in the dialing mode. The effective button locations, as represented in the graphical overlay, may be programmed to be specific areas on the touch surface of the touchpad 220.

The various components of the mobile handset 800 of FIG. 8 are components that are known by those of ordinary skill in the art, and accordingly, a more detailed description regarding their configurations, functionality, and structures have not been included. Similarly, the host 830, including the digital baseband 831 and analog baseband 832, is known by those of ordinary skill in the art, and accordingly, amore detailed description regarding its configurations, functionality, and structure have not been included.

Mobile handset 800 may be a conventional mobile handset, and the embodiments described herein may be implemented therein. For example, the normal electro-mechanical switch array in the mobile handset may be replaced by the keypad sensing device 600 and processing device 210. So instead of a switch array of mechanical switches, the keypad sensing device 600 may include a sensor array, as described herein, or other touch responsive surfaces, upon which the processing device 210 detects a presence of a conductive object, manipulated by a user, on the keypad sensing device to determine touches in different areas of the sensing device, as if electro-mechanical switches were present.

In one embodiment, the vibrator 801 is energized upon recognition of each button press (e.g., activation of a particular effective button location), and provide active feedback (e.g., non-visual feedback) to the user that an activation has occurred and has been recognized by the device. Upon detection of such a touch (e.g., button press), the device (e.g., host 830, or alternatively, a separate controller, such as a touchpad controller 812 or touch screen controller 813) may determine the location and type of touch. If the device determines that the touch event is supposed to represent a switch or button press, then the vibrator 801 is activated to indicate that detection has taken place.

This activation of the vibrator 801 may be programmable in any of a number of possible ways. Each event may produce a burst of vibratory action from the vibrator 801. The burst of vibratory action may be programmable in duration, magnitude, frequency, and pattern. Here a pattern is defined as a combination of more than one of the duration, magnitude, and frequency events that may also contain short periods of no vibration. To further distinguish the touch events, the device may differentiate events indicating activation of different buttons, switches, or functions using different combinations of duration, magnitude, frequency, and pattern of vibration.

The vibrator 801 may be configured to produce different vibrational feedback for different events, such as button presses or switch activation, on the sensing device using different forms of vibration, such as by modifying the frequency, duration, magnitude, pattern, or any combination thereof.

In another embodiment, these bursts of vibratory action can be combined with other forms of indication including audible and visual. Note that said combinations may not contain any vibratory action and may consist of audible only, visual only, or a combination thereof. The selection of which events provide which combinations of vibration, sound, and light, may be fixed or under user control using software, hardware, and/or firmware. The configuration may be controllable by a menu built into the mobile handset. For those feedback types providing verbal messages, the language of the verbal messages may be controllable by a menu built into the mobile handset or similar computing device.

In one embodiment, the vibrator 801 is activated through direct electrical control by a processing device (e.g., a host or controller, such as a microprocessor or microcontroller) located within the mobile handset 800. Alternatively, the vibrator 801 is activated using commands from the host to a driver circuit of the vibrator 801. The vibrator 801 may be electromechanical or piezoelectric in form.

In another embodiment, the vibrator 801 is energized upon detecting a presence of a conductive object, manipulated by a user, and provides active feedback to the user to allow detection of a reference location (e.g., home key) on the sensing device 600. This may be done without button activation. The vibrator 801 may be configured to produce different vibrational feedback for different events, such as detecting a reference location on the sensing device, using different forms of vibration, such as by modifying the frequency, duration, magnitude, pattern, or any combination thereof.

In one embodiment, surface contact alone by the conductive object does not activate any of the effective button locations, but may activate the active feedback for detecting a reference location on the sensing device by the user. Activation of the effective button locations may include deformation of the activating member/e.g., conductive object) such that it presents a larger surface area on the surface area of the sensing device than generated by normal touch (e.g., placing or resting the conductive object on the surface of the sensing device). The larger surface area may be created by application of increased pressure on the deformable member, an alternate positioning of the member that presents a larger contact surface to the surface of the sensing device, or the like.

In one embodiment, there are two levels of surface contact, a high and low level. The low-level surface contact of the sensing surface by the activating member places the device into a location or position indication mode for feedback purposes. The high-level surface contact of the sensing surface by the activating member places the device into an activation indication mode for activation purposes. In the low-level mode, the device provides active feedback to allow the user to detect a reference location on the sensing surface. In the high-level mode, the device may or may not provide active feedback to indicate to the user that a button has been activated (e.g., button press). In one embodiment, in the low-level mode, the light, sound, verbal message, or vibration events may be generated at a first level, and in the high-level mode, the light, sound, verbal message, or vibration events may be generated at a second level, which is higher, lower, or otherwise different than the first level. These indications may be created such that they are different depending on the location of the activation member on the sensing device within the corresponding feedback zones and effective button locations.

As described above, changes in the active feedback provided to the user, as the conductive object moves across multiple effective button locations, allows the user to determine the approximate center of an effective button location by identifying the boundaries of each effective button location. The determination of the approximate center of each effective button location may be important in preventing the invalid activation of an adjacent button as the activating member is applied to the surface of the sensing device in a manner indicating activation of a button. For example, if the activating member was initially positioned on or near the edge of one of the effective button locations (prior to an activation operation), the activation operation could move the centroid of the operation into the adjacent button location. Providing the active feedback to the user helps the user identify the boundaries of the effective button locations to prevent unintentional activation of adjacent effective button locations of the desired button location.

In another embodiment, changes in the active feedback provided to the user, as the conductive object moves across multiple effective button locations, allows the user to determine a reference location of the sensing device, for example, the home key.

It should be noted that the active feedback may be produced based on the location of the conductive object, based on the magnitudes of the touch by the conductive object, both the location and magnitude, or the like.

Although the active feedback described above is provided by the vibrator 801, the active feedback may also be provided to a user using the speaker 802, the light source 803, or the wireless headset 805. Alternatively, the active feedback may be a combination of active feedback provided by the above mentioned components. For example, in addition to providing an active vibrational feedback from the vibrator, light or audio feedback may be provided instead of or to supplement or compliment the vibrational feedback.

In one embodiment, the active feedback may be provided to the user through the wireless headset 805. The processing device may be configured to communicate with the wireless headset 805 to activate an audio feedback to the user. This audio feedback, unlike the feedback provided by the speaker 802, is non-disruptive because the audio feedback is heard through a speaker in an earpiece of the wireless headset 805. Similarly, using the wireless headset 805, blind dialing by the user may be accomplished. The speaker in the earpiece may be driven similarly to the speaker 802. In one embodiment, the wireless headset 805 may include Bluetooth® technology to communicate between the wireless headset 805 and the host 830. Alternatively, other technologies for communicating between a wireless headset and its associated host may be used. The configurations and operations of a wireless headset and a host are known by those of ordinary skill in the art, and accordingly, a detailed description regarding the configuration and operations have not been included.

In another embodiment, a headphone plug may be provided to allow a user to receive the active audio feedback using headphones. Alternatively, the audio feedback may be provided to the user using the speaker 802.

The vibrator 801, speaker 802, and light source 803 are normally programmable in any of a number of possible ways. Each event may produce a burst of vibratory action from the vibrator 801, sound from the speaker element, and light from internal light sources. The burst may be programmable in duration, magnitude, frequency, verbal message, and pattern for each of the source elements. Here a pattern is defined as a combination of more than one of the duration, magnitude, frequency, and verbal message events that may also contain short periods of no feedback. To further distinguish the touch events, the device may differentiate events indicating activation of different buttons, switches, or functions using different combinations of duration, magnitude, frequency, verbal message, and pattern of vibration, sound, and light.

These vibrator bursts may also exist in combination with other forms of indication including audible and visual (light). The selection of which events provide which combinations of vibration, sound, and light, may be fixed or under software and user control. The configuration may be controllable by a menu built into the device.

In one embodiment, the vibrator 801 is electromechanical. Alternatively, the vibrator 801 is piezoelectric. In one embodiment, the speaker 802 is electromechanical. Alternatively, the speaker is piezoelectric. In one embodiment, the light source 803 is an LED. Alternatively, the light source may be other light sources, such as incandescent, CCFL, OLED, electroluminescent, LASER, or the like.

The embodiments described herein may also be configured to detect and/or report the boundaries of button locations on the surface of the sensing device using multiple combinations of vibration, sound, and light, each capable of variation in frequency, amplitude, verbal message, pattern, or the like.

Mobile handsets may include non-volatile memory (NVM) components, such as NVM 806 as illustrated in FIG. 8. These memory components may be used to store the content or descriptors for the various types of active feedback used when presenting feedback to the user. The content may be user updatable Flash ROM, which may accept new content such as downloadable language packs or tone and vibration patterns, or these one or more languages or patterns may be fixed and self contained within the device memory. The NVM 806 may be NAND or NOR flash. The NVM 806 may also be fixed or non alterable read-only memory (ROM).

Mobile handsets may include various components, such as illustrated and described with respect to FIG. 8. However, the embodiments described herein may be implemented in a mobile handset that includes more or less components than illustrated and described with respect to FIG. 8. For example, the mobile handset 800 includes only a display 811 and not the touch screen 810. Alternatively, the embodiments described herein may be implemented in electronic devices other than mobile handsets, such as, for example, PDAs, or the like.

Figure 9A:
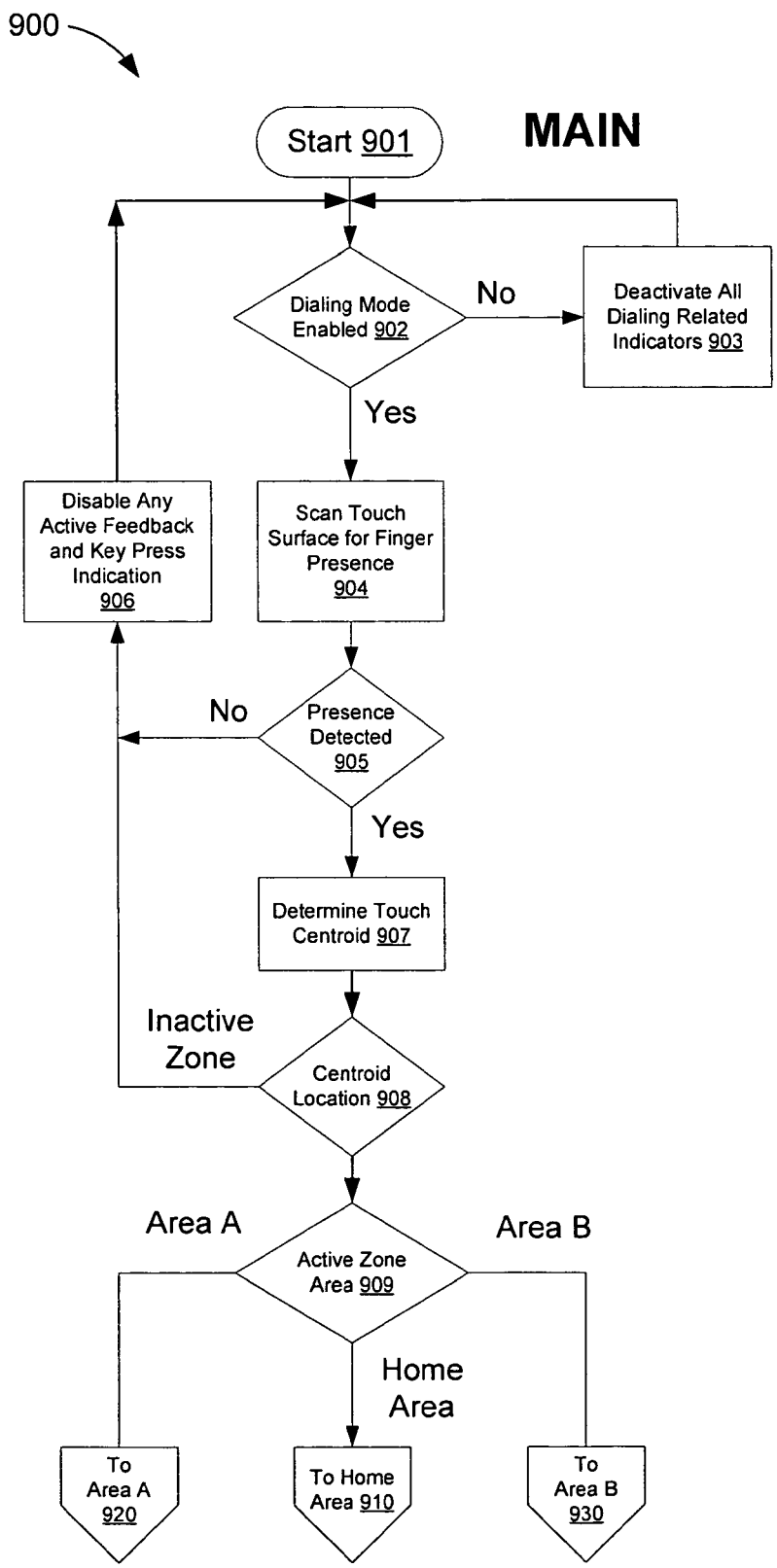
FIG. 9A illustrates a flow chart of one embodiment of a method for providing active feedback to a user.
Figure 9B:
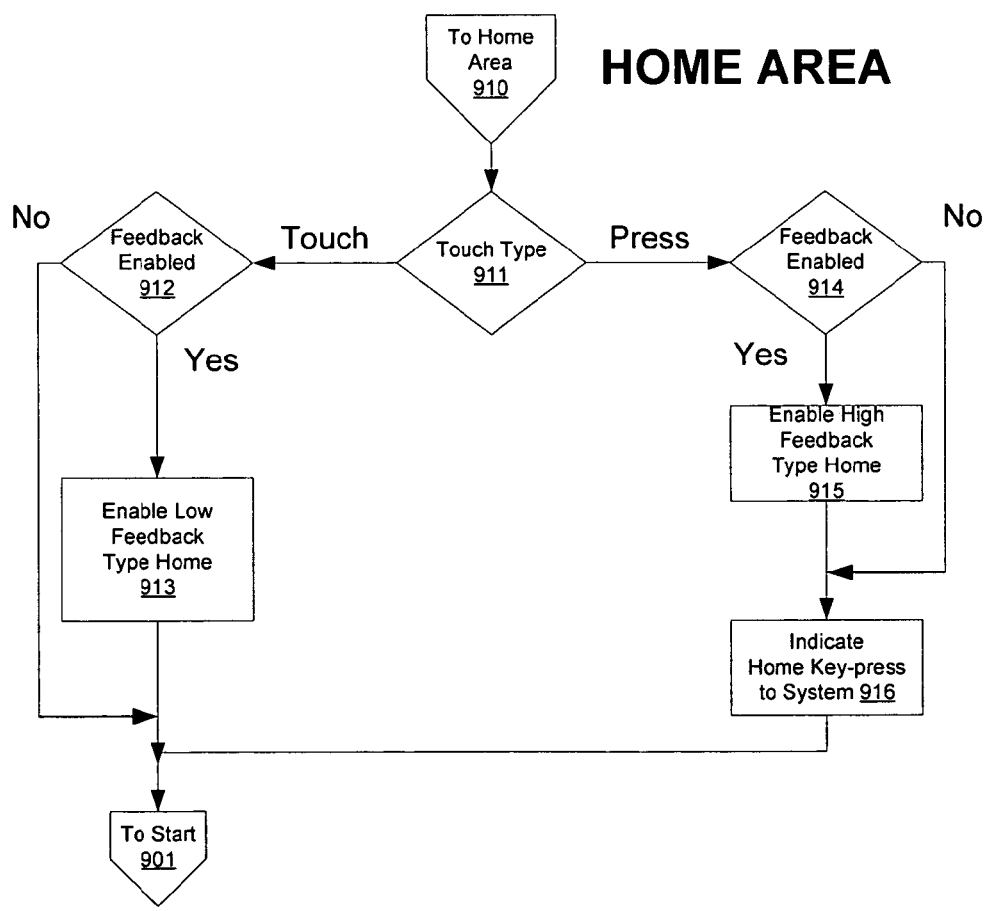
FIG. 9B illustrates a flow chart of one embodiment of the method of 9A when the centroid location is detected in the Home Area of the sensing device.
Figure 9C:
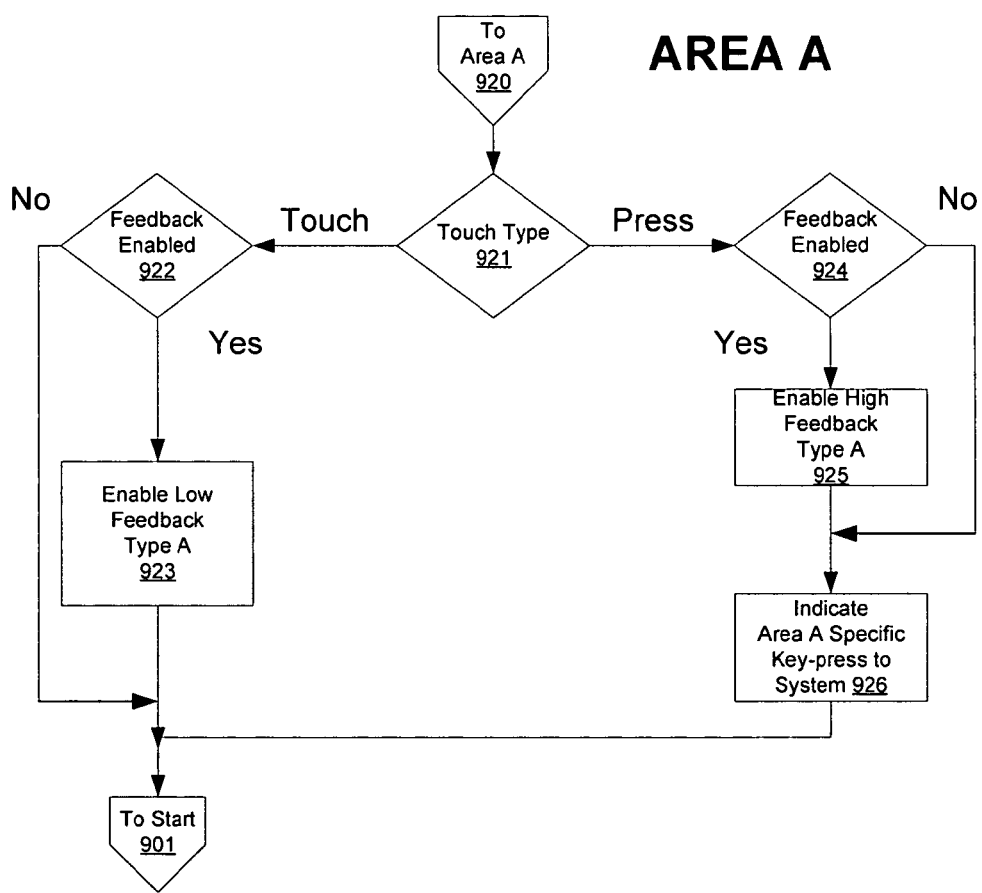
FIG. 9C illustrates a flow chart of one embodiment of the method of 9A when the centroid location is detected in a first non-Home Area of the sensing device.

FIG. 9A-C illustrates a flow chart of one embodiment of a method 900 for providing active feedback to a user. Method 900 includes a starting operation 901, which may include a default mode of the device, or alternatively, a mode that the device is put into upon startup of the device. Method 900 includes determining whether a dialing mode is enabled, operation 902. If the dialing mode is not enabled, all dialing related indicators are deactivated, operation 903, and the method returns to the start operation 901. However, if the dialing mode is enable in operation 902, the method includes scanning the touch surface (e.g., scanning one or more sensor elements of the device) to detect a presence of a conductive object (e.g., finger) on the device, operation 904, and determines if the presence is detected, operation 905. If the presence is not detected, the method includes disabling any active feedback and key press indication, operation 906, and returns to the start operation 901. However, if the presence is detected in operation 905, the method includes determining a centroid location of the presence, operation 907. The method determines where the centroid location is with respect to the feedback zones, operation 908. If it is determined that the centroid location is in an inactive zone, the method includes disabling any active feedback and key press indication, operation 906, and returns to the start operation 901; otherwise, the method determines that the centroid location is in an active zone area, and subsequently, determines which active zone the centroid is located, operation 909.

Figure 9D:
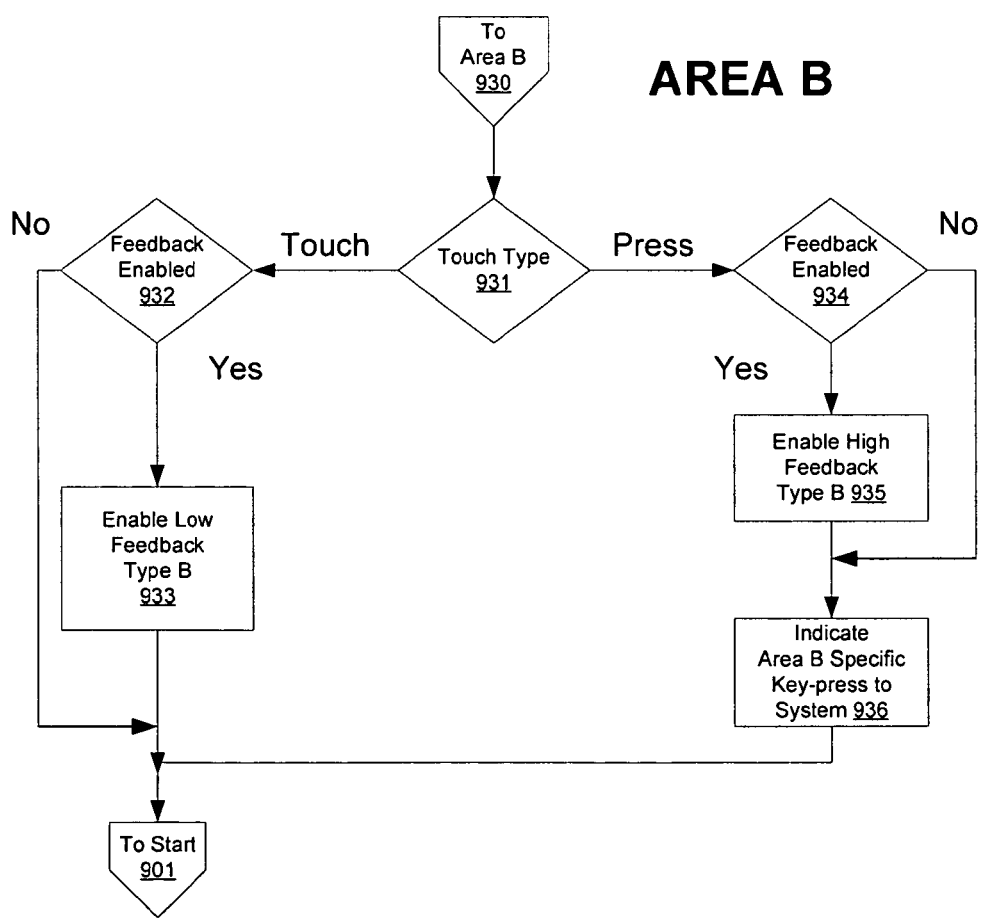
FIG. 9D illustrates a flow chart of one embodiment of the method of 9A when the centroid location is detected in a second non-Home Area of the sensing device.

The method determines whether the centroid is located in one or more active zones. This embodiment illustrates and describes three different active zone areas, Home Area, Area A, and Area B. The operations corresponding to these determinations are described and illustrated with respect to FIGS. 9B-9D, respectively.

If the centroid is located in the Home Area, operation 910, the method further includes determining a touch type, operation 911. This may include determining whether the user has touched the surface or pressed the surface. This may be determined as described below with respect to FIG. 10. If it is determined that the presence of the conductive object is categorized as a 'Touch,' the method includes determining if the feedback is enable, operation 912. If the active feedback is enabled, the method includes enabling an active feedback that corresponds to Home Area (e.g., reference location's feedback zone), such as e.g., low active feedback type for the Home Area, operation 913. However, if the feedback is disabled, the operation in 913 may be skipped, and the method returns to the start operation 901. If it is determined that the presence of the conductive object is categorized as a 'Press,' in operation 911, the method includes determining if the feedback is enabled, operation 914. If the active feedback is enabled, the method includes enabling an active feedback that corresponds to the button press of the reference location (e.g., high feedback type for the Home Area), operation 915. However, if the feedback is disabled, the operation in 915 may be skipped, and the method includes indicating a home key press to the system, operation 916, and returns to the start operation 901.

If the centroid is located in the Area A, operation 920, the method further includes determining a touch type, operation 921. This may include determining whether the user has touched the surface or pressed the surface. This may be determined as described below with respect to FIG. 10. If it is determined that the presence of the conductive object is categorized as a 'Touch,' the method includes determining if the feedback is enable, operation 922. If the active feedback is enabled, the method includes enabling an active feedback that corresponds to Area A (e.g., feedback zone of Area A), such as low active feedback type for the Area A, operation 923. However, if the feedback is disabled, the operation in 923 may be skipped, and the method returns to the start operation 901. If it is determined that the presence of the conductive object is categorized as a 'Press,' in operation 921, the method includes determining if the feedback is enabled, operation 924. If the active feedback is enabled, the method includes enabling an active feedback that corresponds to the button press of the Area A (e.g., high feedback type for the Area A), operation 925. However, if the feedback is disabled, the operation in 925 may be skipped, and the method includes indicating an Area A specific key press to the system, operation 926, and returns to the start operation 901.

If the centroid is located in the Area B, operation 930, the method further includes determining a touch type, operation 931. This may include determining whether the user has touched the surface or pressed the surface. This may be determined as described below with respect to FIG. 10. If it is determined that the presence of the conductive object is categorized as a 'Touch,' the method includes determining if the feedback is enable, operation 932. If the active feedback is enabled, the method includes enabling an active feedback that corresponds to Area B (e.g., feedback zone of Area B), such as low active feedback type for the Area B, operation 933. However, if the feedback is disabled, the operation in 933 may be skipped, and the method returns to the start operation 901. If it is determined that the presence of the conductive object is categorized as a 'Press,' in operation 931, the method includes determining if the feedback is enabled, operation 934. If the active feedback is enabled, the method includes enabling an active feedback that corresponds to the button press of the Area B (e.g., high feedback type for the Area B), operation 935. However, if the feedback is disabled, the operation in 935 may be skipped, and the method includes indicating an Area B specific key press to the system, operation 936, and returns to the start operation 901.

Figure 10:
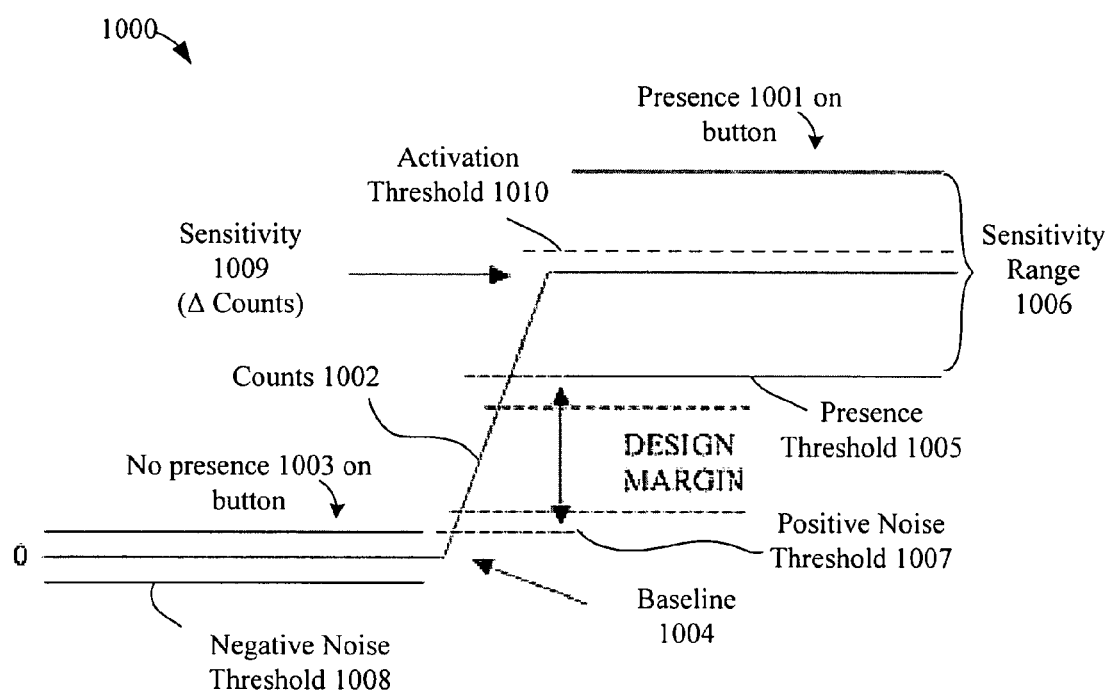
FIG. 10 illustrates a graph of a sensitivity of a single sensor element of a sensing device, having two thresholds for providing active feedback upon detecting a presence of a conductive object and for detecting activation of the sensor element by the presence of the conductive object.

FIG. 10 illustrates a graph of a sensitivity of a single sensor element of a sensing device, having two thresholds for providing active feedback upon detecting a presence of a conductive object and for detecting activation of the sensor element by the presence of the conductive object. Graph 1000 includes the counts 1002 as measured on a single sensor element of a sensing device for "no presence" 1003 on the touch-sensor button, and for "presence" 1001 on the touch-sensor button. "No presence" 1003 is when the sensing device does not detect the presence of the conductive object, such as a finger. "No presence" 1003 is detected between a range of noise. The range of noise may include a positive noise threshold 1007 and a negative noise threshold 1008. So long as the counts 1002 are measured as being between the positive and negative thresholds 1007 and 1008, the sensing device detects "no presence" 1003. "Presence" 1001 is when the sensing device detects the presence of the conductive object (e.g., finger). "Presence" 1001 is detected when the counts 1002 are greater than a first threshold, presence threshold 1005. The presence threshold 1005 indicates that a presence of a conductive object is detected on the sensing device. The sensitivity 1009 ($C_F/C_P$) of the single button operation is such that when it detects the presence of the conductive object, the capacitance variation ($\Delta n$) is above the presence threshold 1005. The sensitivity 1009 may have a range, sensitivity range 1006. Sensitivity range 1006 may have a lower and upper limit or threshold. The lower threshold is equal to or greater than the presence threshold 1005, allowing a "presence" 1001 to be detected on the sensing device. The sensing device may be configured such that there is a design margin between the presence threshold 1005 and the positive noise threshold 1007. The sensitivity range 1006 may be based on the surface area of the sensor element of the sensing device. It should be noted that the baseline 1004, negative noise threshold 1008, positive noise threshold 1007, presence threshold 1005, and sensitivity range 1006 are all within a range of operation (or baseline range) of the sensing device.

Graph 1000 also includes a second threshold, activation threshold 1010. The activation threshold 1010 indicates that a presence of a conductive object is detected on a sensing surface of a device such that the sensor element is activated. For example, the capacitance may increase when the user presses the conductive object against the sensing surface, as opposed to merely placing or resting the conductive object on the sensing surface.

In this embodiment, the counts 1002 are measured such that they exceed the first threshold, presence threshold 1005, but not the second threshold, activation threshold 1010, resulting in the device providing active feedback without activation, such as illustrated by 740 and 741 of FIGS. 7A and 7B. Alternatively, the counts 1002 may be measured such that they exceed both thresholds, presence threshold 1005 and activation threshold 1010, resulting in the device providing active feedback with activation, such as illustrated by 750 and 751 of FIGS. 7A and 7B. As described above, dissimilar active feedback may be provided to the user when the presence of the conductive object is detected and when the button is activated, such as active feedback 715 and active feedback 716. Alternatively, the same active feedback may be provided to the user when the presence of the conductive object is detected and when the button is activated.

In one embodiment, the method may include determining whether the user has touched the surface or pressed the surface. The user has 'touched' the surface when the capacitance is above a first threshold (e.g., presence threshold 1005) and below a second threshold (e.g., activation threshold 1010). The user has 'pressed' the surface when the capacitance is above both the first and second thresholds (e.g., presence threshold 1005 and activation threshold 1010). Alternatively, other criteria may be used to determine whether the user has 'touched' or 'pressed' the sensing surface of the device, for example, measuring pressure or change of pressure of the conductive object against the sensing surface, measuring time of presence of conductive object on the surface, or recognizing a tap gesture to distinguish a press from a touch, or the like.

The embodiments herein have been described with respect to a keypad sensing device that utilizes capacitance sensing to detect the presence of the conductive object, manipulated by the user, on the keypad sensing device. Alternatively, the embodiments may be implemented in other capacitance sensing devices, such as touchpads, sliders, touch-sensor panels, touch screens, or the like. The embodiments described herein may also be implemented using a touch-sensor surface that varies in resistance, capacitance, inductance, or any combination thereof, relative to the location and amount of touch detected. Also, the touch-sensor surface may be separate from or integrated with a display of the device, and may be opaque or transparent.

As previously described, previous attempts to provide feedback to the user have been in the form of tactile feedback by integrating additional passive mechanical elements below the touch-sensitive portion of the device to mimic the tactile response of traditional electromechanical switches, or in the form of surface features. The inclusion of these mechanical elements increases the cost, weight, and thickness of the device, while also lowering the reliability of the device. However, using the embodiments described herein, the mobile handset 800 may be configured to provide active feedback to a user to indicate activation of a button (e.g., button press), and/or to allow detection of a reference location (e.g., home key) on the sensing device without using passive tactile feedback generators or surface features, as in the conventional designs.

The embodiments described herein allow a user to manipulate a conductive object on the sensing device and determine when an activation of a button has occurred, and when the conductive object is located on a reference location for orientation purposes. This may be done using active feedback, as described herein. Accordingly, a user may operate the sensing device without sight, or alternatively, without sight and sound, such as for such operations as blind dialing on a mobile handset.

The embodiments described herein may reduce cost and spatial volume of the device, while improving reliability, and still provide feedback of events on the device, such as button activation and/or reference location detection. The embodiments described herein may also allow physically handicapped users to control these devices without external help.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A device, comprising:
    an audio mechanism; and
    a processing device coupled to display on-screen buttons on a touch-screen display, wherein the processing device is configured to detect a conductive object proximate to the touch-screen display and to determine a position of the conductive object on the touch-screen display, wherein the processing device is configured to provide different sounds via the audio mechanism for different ones of the on-screen buttons when the position of the conductive object is determined within the different on-screen buttons to allow detection of a reference location on the touch-screen display, wherein the reference location is a defined physical area on a sensor array of the touch screen display.

2. The device of claim 1, wherein the reference location is a defined physical area on the sensing device that provides a user with spatial orientation of the on-screen buttons of the touch-screen display.

3. The device of claim 1, wherein the reference location corresponds to a physical location on the sensing device to allow a user to navigate to the on-screen buttons of the touch-screen display.

4. The device of claim 1, wherein the device is a hand-held device.

5. The device of claim 2, wherein the hand-held device is a mobile phone.

6. The device of claim 1, wherein the processing device is configured to determine the position of the conductive object without generating a signal indicating activation of the corresponding button location.

7. The device of claim 1, further comprising a vibrating mechanism to provide vibrations, the vibrating mechanism coupled to the processing device, wherein the processing device is configured to provide different vibrations via the vibrating mechanism for different ones of the on-screen buttons when the position of the conductive object is determined within the different on-screen buttons.

8. The device of claim 1, wherein the audio mechanism is a speaker.

9. The device of claim 8, wherein the speaker is in an earpiece of a mobile phone.

10. The device of claim 1, wherein the audio mechanisms is a wireless headset.

11. The device of claim 1, further comprising a illuminating mechanism to provide one or more lights, the illuminating mechanism coupled to the processing device, wherein the processing device is configured to provide different lights via the illuminating mechanism for different ones of the on-screen buttons when the position of the conductive object is determined within the different on-screen buttons.

12. The device of claim 1, wherein the touch-screen display comprises a plurality of capacitive sense elements coupled to the processing device to detect the conductive object proximate to the touch-screen display.

13. The device of claim 12, wherein the processing device comprising one or more capacitance sensors coupled to the plurality of capacitive sense elements to determine capacitances on individual ones of the capacitive sense elements or between the capacitive sense elements.

14. The device of claim 1, wherein the different sounds are touch-tone sounds.

15. A device, comprising:
a touch-screen display; and
a processing device coupled to the touch-screen display, wherein the processing device is configured to display on-screen buttons on the touch-screen display, wherein the processing device is configured to detect a conductive object proximate to the touch-screen display and to determine a position of the conductive object on the touch-screen display, wherein the processing device is configured to provide different touch-tone sounds via a speaker for different ones of the on-screen buttons when the position of the conductive object is determined within the different on-screen buttons to allow detection of a reference location on the touch-screen display, wherein the reference location is a defined physical area on a sensor array of the touch screen display.

16. The device of claim 15, wherein the reference location corresponds to a physical location on the sensing device to allow a user to navigate to the on-screen buttons of the touch-screen display.

17. The device of claim 15, further comprising the speaker.

18. The device of claim 15, further comprising a wireless communication circuit configured to be communicatively coupled to a wireless headset, and wherein the speaker is part of the wireless headset.

19. An apparatus, comprising:
an audio mechanism to produce touch-tone sounds;
a touch-screen display configured to display an on-screen dialing keypad comprising on-screen buttons corresponding to at least the numbers zero to nine; and
a processing device coupled to the touch-screen display, wherein the processing device is configured to determine a position of a conductive object proximate to the touch-screen display, wherein the processing device is configured to provide different touch-tone sounds via the audio mechanism for different ones of the on-screen buttons when the position of the conductive object is determined within the different on-screen buttons to allow detection of a reference location on the touch-screen display, wherein the reference location is a defined physical area on a sensor array of the touch screen display.

20. The apparatus of claim 19, wherein the reference location is the on-screen button corresponding to the number five.

* * * * *